United States Patent
Lin et al.

(10) Patent No.: US 12,289,692 B2
(45) Date of Patent: Apr. 29, 2025

(54) METHOD FOR IMPROVING TRANSMISSION POWER MANAGEMENT WITH COMPLIANCE TO REGULATIONS OF RADIOFREQUENCY EXPOSURE

(71) Applicant: MEDIATEK Inc., Hsin-Chu (TW)

(72) Inventors: Yi-Hsuan Lin, Hsinchu (TW);
Han-Chun Chang, Hsinchu (TW);
Chih-Yuan Lin, Hsinchu (TW);
Yi-Ying Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 589 days.

(21) Appl. No.: 17/717,207

(22) Filed: Apr. 11, 2022

(65) Prior Publication Data

US 2022/0369246 A1 Nov. 17, 2022

Related U.S. Application Data

(60) Provisional application No. 63/186,861, filed on May 11, 2021, provisional application No. 63/253,157, filed on Oct. 7, 2021.

(51) Int. Cl.
*H04W 52/36* (2009.01)
*H04L 1/00* (2006.01)
(Continued)

(52) U.S. Cl.
CPC ......... *H04W 52/367* (2013.01); *H04L 1/0003* (2013.01); *H04W 52/225* (2013.01); *H04W 52/241* (2013.01)

(58) Field of Classification Search
CPC ............ H04W 52/225; H04W 52/241; H04W 52/367; H04W 52/34; H04W 52/24;
(Continued)

(56) References Cited

U.S. PATENT DOCUMENTS 9,622,187 B2  4/2017  Logan et al.
10,652,833 B2  5/2020  Nadakuduti et al.
(Continued)

OTHER PUBLICATIONS

TW Office Action dated Jan. 11, 2023 in Taiwan application No. 111117675.

*Primary Examiner* — Hassan A Phillips
*Assistant Examiner* — Prenell P Jones
(74) *Attorney, Agent, or Firm* — McClure, Qualey & Rodack, LLP

(57) ABSTRACT

A method for improving transmission power management with compliance to regulations of radiofrequency exposure, which may comprise: at a current time, estimating whether a window average power, which may reflect average power transmitted using a radio technology during a moving time window, will exceed a power limit after the current time; if true, proceeding to at least one of a first handling subroutine and a second handling subroutine to set a power cap, and causing power transmitted to be capped by the power cap after the current time. The first handling subroutine may comprise: scheduling to set the power cap lower at a scheduled time. Estimating whether the window average power will exceed the power limit may involve discarding one of a plurality of power records. The second handling subroutine may comprise: setting the power cap not higher than the discarded one of the plurality of power records.

20 Claims, 18 Drawing Sheets

(51) Int. Cl.
*H04W 52/22* (2009.01)
*H04W 52/24* (2009.01)

(58) Field of Classification Search
CPC .... H04W 52/22; H04W 52/36; H04L 1/0003; H04L 1/00
See application file for complete search history.

(56) References Cited

U.S. PATENT DOCUMENTS

| | | | |
|---|---|---|---|
| 2010/0298016 A1* | 11/2010 | Madan | H04W 72/54 455/501 |
| 2012/0178402 A1* | 7/2012 | Krishnamoorthy | H04W 76/50 455/404.1 |
| 2015/0244505 A1* | 8/2015 | Celebi | H04L 5/1461 370/277 |
| 2015/0257167 A1* | 9/2015 | Chen | H04W 72/542 370/330 |
| 2016/0205631 A1* | 7/2016 | Chen | H04W 52/367 455/522 |
| 2020/0229206 A1* | 7/2020 | Badic | G05D 1/225 |
| 2020/0260387 A1 | 8/2020 | Fu | |
| 2021/0099194 A1 | 4/2021 | Jadhav | |
| 2021/0250775 A1* | 8/2021 | Hardin | H04W 52/367 |
| 2022/0320707 A1* | 10/2022 | Li | H04B 1/38 |

* cited by examiner

10

METHOD FOR IMPROVING TRANSMISSION POWER MANAGEMENT WITH COMPLIANCE TO REGULATIONS OF RADIOFREQUENCY EXPOSURE

This application claims the benefit of U.S. provisional application Ser. No. 63/186,861, filed May 11, 2021, the subject matter of which is incorporated herein by reference.

FIELD OF THE INVENTION

The present invention relates to method for improving transmission power management with compliance to regulations of radiofrequency (RF) exposure, and more particularly, to method which may control transmission power to comply with regulations of RF exposure adaptively in response to various radio technologies, scenarios, and configurations.

BACKGROUND OF THE INVENTION

User equipment (UE) with RF communication functionality, such as mobile phone, is essential for modern daily life. However, excessive RF exposure may be harmful to user. To address concerns of RF exposure, UE must comply with regulations of RF exposure declared by officials such as federal communications commission (FCC) of USA, innovation, science, and economic development (ISED) of Canada and conformite europeenne (CE) of Europe.

RF exposure relates to many aspects. First, a UE may implement RF communication functionality by more than one radio technologies; each of the radio technologies contributes to RF exposure, but different radio technologies have different ways to quantify RF exposure. Radio technology utilizing frequency under 6 GHz quantifies RF exposure by specific absorption rate (SAR), while radio technology utilizing frequency higher than or equal to 6 GHz quantifies RF exposure by power density (PD).

Also, for each radio technology, a UE may support various configurations to transmit RF signals; these configurations may be different in antenna, band, beam, technology, sub-band, one or more exposure condition indices (which may relate to, e.g., whether the UE is near head or arm of user, and/or whether the UE is executing application(s) demanding large amount of communication, etc.), simultaneous transmitted state, mobile country code (MCC) and/or mobile network code (MNC), modulation, bandwidth, maximum power reduction (MPR), path, duty cycle, and combination of band and subscriber identity module (SIM), etc. For example, the UE may have one or more antenna modules accommodated at one or more distinct locations of the UE away from user by one or more different distances respectively, and each antenna module may transmit electromagnetic waves of one or more bands by one or more beams along one or more directions, respectively. Each of the configurations contributes to RF exposure.

Moreover, a UE must conduct RF communication under various scenarios; these scenarios may be different in one or more transmitting performance indices (which may relate to, e.g., duty cycle of transmitting, error vector magnitude (EVM) of transmitting, target power, throughput, and/or modulation and coding scheme (MCS), etc.), one or more receiving performance indices (which may relate to, e.g., duty cycle of receiving, signal-to-Interference-plus-noise ratio (SINR) of receiving, MCS, received signal strength indication (RSSI), and/or reference signal receiving power (RSRP), etc.), the configuration(s) and/or proximity between user and the UE. Each of the scenarios affects RF exposure; for example, to conduct RF communication with higher throughput, a UE may increase transmission power, but may consequently increase RF exposure.

While RF exposure varies with different aspects including various radio technologies, various configurations and various scenarios, there lacks a transmission power management method with a comprehensive consideration to fully cover these aspects when maintaining compliance to regulations of RF exposure. To comply with regulations of RF exposure, a conservative strategy is always keeping transmission power low regardless of different radio technologies, configurations, and scenarios, but such strategy will degrade data throughput and efficiency of communication capacity, and is therefore unsatisfactory.

SUMMARY OF THE INVENTION

An object of the invention is providing a method (e.g., 200 in FIG. 2 or 4) for improving transmission power management with compliance to regulations of RF exposure. The method may comprise a first-radio type-one control procedure (e.g., 2031 in FIG. 4). The first-radio type-one control procedure may be executed by a UE (e.g., 100 in FIG. 1), and may comprise: (e.g., step 4071 in FIG. 4) at a current time (e.g., t1[$i$] in FIG. 8), estimating whether a first-radio window average power (e.g., Pavg1 in FIG. 8), which may reflect average power transmitted using a first radio technology during a moving time window (e.g., w1[$i$] in FIG. 3$a$), will exceed a first-radio power limit (e.g., Plimit1 in FIG. 8) after the current time; if it is estimated that the first-radio window average power will exceed the first-radio power limit after the current time, proceeding to at least one of a first handling subroutine (e.g., 9101 in FIG. 9) and a second handling subroutine (e.g., 9201 in FIG. 9) to set a first-radio power cap (e.g., Pcap1 in FIG. 2, 4, or 8). The method may further comprise: (e.g., step 4131 in FIG. 4) causing power transmitted using the first radio technology to be capped by the first-radio power cap after the current time. Estimating whether the first-radio window average power will exceed the first-radio power limit after the current time may comprise: by assuming that the first-radio power cap is lowered at a hypothetical back-off time (e.g., t1[$i\_hb$] in FIG. 8), calculating the first-radio window average power of a future time (e.g., t1[$i\_f$] in FIG. 8), wherein the hypothetical back-off time may not be earlier than the current time, and the future time may be later than the hypothetical back-off time. The first handling subroutine may comprise: scheduling to set the first-radio power cap lower at a scheduled time (e.g., t1[$i\_sb$] in FIG. 9) earlier than the hypothetical back-off time. Estimating whether the first-radio window average power will exceed the first-radio power limit after the current time may involve discarding one (e.g., pr1[$i-K1+1$] in FIG. 9) of a plurality of power records (e.g., pr1[$i-K1$] to pr1[$i$] in FIG. 7). And the second handling subroutine may comprise: setting the first-radio power cap not higher than the discarded one of the plurality of power records.

In an embodiment, the first handling subroutine may further comprise: setting the first-radio power cap to one or more first levels (e.g., L1[1] to L1[4] in FIG. 8) higher than the first-radio power limit; and, when scheduling to set the first-radio power cap lower at the scheduled time, scheduling to set the first-radio power cap to one or more second levels (e.g., L1[5] to L1[8] in FIG. 8) at the scheduled time. Each of the second level(s) may be lower than the first level(s) and the first-radio power limit.

In an embodiment (e.g., FIG. 4), the first-radio type-one control procedure (e.g., 2031) may further comprise: (e.g., step 4111) if it is estimated that the first-radio window average power will not exceed the first-radio power limit after the current time, setting the first-radio power cap to remain unchanged or to be higher.

In an embodiment (e.g., FIG. 8), estimating whether the first-radio window average power will exceed the first-radio power limit after the current time may further comprise: if the first-radio window average power of the future time exceeds the first-radio power limit, estimating that the first-radio window average power will exceed the first-radio power limit after the current time.

In an embodiment (e.g., FIG. 4), the method may further comprise a second-radio transmission power control process (e.g., 2012 in FIG. 2 or 4), and the second-radio transmission power control process may comprise: (e.g., step 4152) calculating a second-radio power margin (e.g., Pmrgn2) according to power transmitted using a second radio technology. The first-radio type-one control procedure may further comprise: before estimating whether the first-radio window average power will exceed the first-radio power limit after the current time, (e.g., step 4031) determining a value of the first-radio power limit according to the second-radio power margin.

In an embodiment (e.g., FIG. 20b), determining the value of the first-radio power limit according to the second-radio power margin may comprise: causing the value of the first-radio power limit to be positively correlated to the second-radio power margin.

In an embodiment (e.g., FIG. 5), the UE may support a plurality of configurations (e.g., c1[1] to c1[Nc1] in FIG. 1 or 5) to transmit using the first radio technology, and the plurality of configurations may be associated with a plurality of power limit candidates (e.g., PlimitC1[1] to PlimitC1[Nc1] in FIG. 5). A current subset (e.g., Uc1[i]) of the plurality of configurations, which is possible to be adopted at the current time, may be associated with a current subset (e.g., UPlimitC1[i]) of the plurality of power limit candidates. The first-radio type-one control procedure may further comprise: before estimating whether the first-radio window average power will exceed the first-radio power limit after the current time, (e.g., step 4031) determining at least a current value of the first-radio power limit according to one or more first-radio power limit decision factors. The one or more first-radio power limit decision factors may include selected one or ones of the current subset of the plurality of power limit candidates.

In an embodiment (e.g., FIG. 7), the first-radio type-one control procedure may further comprise: (e.g., step 7011 in FIG. 7) checking whether the first-radio power limit changes by comparing whether the current value of the first-radio power limit is different from a preceding value of the first-radio power limit; if the first-radio power limit changes, (e.g., step 7031) scaling each of the plurality of power records by one or more scaling coefficients (e.g., s1_1, s1_2, etc.) to update the plurality of power records.

In an embodiment, the scaling coefficient may be positively correlated to the current value of the first-radio power limit, and/or may be negatively correlated to the preceding value of the first-radio power limit.

In an embodiment (e.g., FIG. 7), the first-radio type-one control procedure may further comprise: if the first-radio power limit does not change, (e.g., step 7051 in FIG. 7) weighting a collection (e.g., Upc1) of power contributions (e.g., pc1[2], pc1[3], pc1[5], pc1[6]) by a collection (e.g., Uwc1) of weighting coefficients (e.g., wc1[2], wc1[3], wc1 [5], wc1[6]) to form a collection (e.g., Uwpc1) of weighted power contributions (e.g., wpc1[2], wpc1[3], wpc1[5], wpc1 [6]), and calculating a current power record (e.g., pr1[i]), which may reflect average power transmitted using the first radio technology during a current period (e.g., T1[i]), according to (e.g., by a sum of) the collection of weighted power contributions. Each (e.g., pc1[n]) of the collection of power contributions may reflect average power transmitted by an associated one (e.g., c1[n]) of the current subset (e.g., Uc1[i]) of the plurality of configurations during the current period.

In an embodiment (e.g., FIG. 7), each (e.g., wc1[n]) of the collection of weighting coefficients may be positively correlated to the current value of the first-radio power limit, and/or may be negatively correlated to an associated one (e.g., PlimitC1[n]) of the current subset (e.g., UPlimitC1[i] in FIG. 5) of the plurality of power limit candidates.

In an embodiment (e.g., FIG. 5), the one or more first-radio power limit decision factors may further include the second-radio power margin.

In an embodiment (e.g., FIG. 5), determining the current value of the first-radio power limit according to the one or more first-radio power limit decision factors may comprise: scaling the selected one(s) of the current subset of the plurality of power limit candidates and/or the first radio auxiliary data by a ratio (e.g., r1) determined according to the second-radio power margin.

In an embodiment, different ones of the plurality of configurations may be different in at least one of: antenna, band, beam technology, sub-band, one or more exposure condition indices, simultaneous transmitted state, MCC and/or mobile network code (MNC), modulation, bandwidth, maximum power reduction (MPR), path, duty cycle, and combination of band and subscriber identity module (SIM); wherein the one or more exposure condition indices may relate to: whether the UE is near head or arm of user, and/or whether the UE is executing application(s) demanding large amount of communication, etc.

In an embodiment (e.g., FIGS. 4 and 16), the method may further comprise: (e.g., step 4011 in FIG. 4) in response to a scenario, switching between the first-radio type-one control procedure and a first-radio type-two control procedure (e.g., 2051), and the first-radio type-two control procedure may comprise: setting the first-radio power cap to a value of a plurality of gears. In an embodiment, the value may change by switching between different ones of the plurality of gears in response to at least one of: duty cycle and currently adopted one or ones of the plurality of configurations.

In an embodiment, the scenario may relate to at least one of: one or more transmitting performance indices, one or more receiving performance indices, one or more of the plurality of configurations and proximity between user and the UE. In an embodiment, the one or more transmitting performance indices may relate to at least one of: duty cycle of transmitting, error vector magnitude (EVM) of transmitting, target power, throughput and MCS, block error rate (BLER), resource block (RB), transmission block size (TBS) and latency, etc. In an embodiment, the one or more receiving performance indices may relate to at least one of: duty cycle of receiving, SINR of receiving, MCS, RSSI and/or RSRP, etc.

An object of the invention is providing a method (e.g., 200 in FIG. 4) for improving transmission power management with compliance to regulations of RF exposure, the method may comprise: (e.g., step 4152 in FIG. 4) calculating a second-radio power margin (e.g., Pmrgn2) according to power transmitted using a second radio technology, (e.g., step 4031) determining a first-radio power limit (e.g., Plimit1) according to the second-radio power margin, (e.g., step 4091 or 4111) setting a first-radio power cap (e.g., Pcap1) according to whether a first-radio window average power (e.g., Pavg1), which may reflect average power transmitted using a first radio technology during a moving time window, exceeds the first-radio power limit, and (e.g., step 4131) causing power transmitted using the first radio technology to be capped by the first-radio power cap.

In an embodiment (e.g., FIG. 20*b*), determining the first-radio power limit according to the second-radio power margin may comprise: causing the first-radio power limit to be positively correlated to the second-radio power margin.

An object of the invention is providing a method (e.g., 200 in FIG. 4) for improving transmission power management with compliance to regulations of RF exposure, and the method may comprise: during one or more first periods, determining a first-radio power cap based on an estimation of whether a first-radio window average power, which may reflect average power transmitted using the first radio technology during a moving time window, will exceed a first-radio power limit after a current time; during one or more second periods, determining the first-radio power cap in response to duty cycle and/or currently adopted one or ones the plurality of configurations, and causing power transmitted using the first radio technology to be capped by the first-radio power cap.

An object of the invention is providing a method (e.g., 200 in FIG. 4) for improving transmission power management with compliance to regulations of RF exposure, and the method may comprise: (e.g., step 4031) determining a power limit (e.g., Plimit1) according to selected one or ones of a current subset (e.g., UPlimitC1[*i*] in FIG. 5) of a plurality of power limit candidates (e.g., PlimitC1[1] to PlimitC1[Nc1] in FIG. 5), and (e.g., step 4091 or 4111 in FIG. 4) setting a power cap (e.g., Pcap1) according to the power limit and a plurality of power records (e.g., pr1[*i*−K1] to pr1[*i*] in FIG. 7); and (e.g., step 4131 in FIG. 4) causing power transmitted using a first radio technology to be capped by the power cap. The UE may support a plurality of configurations to transmit using the first radio technology. The plurality of power limit candidates may be associated with the plurality of configurations (e.g., c1[1] to c1[Nc1] in FIG. 5) respectively. The current subset of the plurality of power limit candidates may be associated with a current subset (e.g., Uc1[*i*] in FIG. 5) of the plurality of configurations, which is possible to be adopted at a current time (e.g., t1[*i*]).

In an embodiment (e.g., FIG. 7), the method may further comprise: (e.g., step 7011) checking whether the current subset of the plurality of configurations changes by comparing whether the current subset of the plurality of configurations is different from a preceding subset of the plurality of configurations, which is possible to be adopted at a preceding time (e.g., t1[*i*−1]) earlier than the current time; if the current subset of the plurality of configurations does not change, (e.g., step 7051 in FIG. 7) weighting a collection (e.g., Upc1) of power contributions (e.g., pc1[2], pc1[3], pc1[5], pc1[6]) by a collection (e.g., Uwc1) of weighting coefficients (e.g., wc1[2], wc1[3], wc1[5], wc1[6]) to form a collection (e.g., Uwpc1) of weighted power contributions (e.g., wpc1[2], wpc1[3], wpc1[5], wpc1[6]), and calculating one of the plurality of power record (e.g., pr1[*i*]), which may reflect average power transmitted using the first radio technology during a current period (e.g., T1[*i*]), according to (e.g., by a sum of) the collection of weighted power contributions. Each (e.g., pc1[*n*]) of the collection of power contributions may reflect average power transmitted by an associated one (e.g., c1[*n*]) of the current subset (e.g., Uc1[*i*]) of the plurality of configurations during the current period.

In an embodiment, the method may further comprise: if the current subset of the plurality of configurations changes, (e.g., step 7031 in FIG. 7) scaling each of the plurality of power records by one or more scaling coefficients (e.g., s1_1, s1_2, etc.) to update the plurality of power records.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 11 and 18 depict levels which the power cap may be set to;

FIGS. 12 and 19 depict comparison of different control procedures; and

DETAILED DESCRIPTION OF PREFERRED EMBODIMENTS

Figure 1:
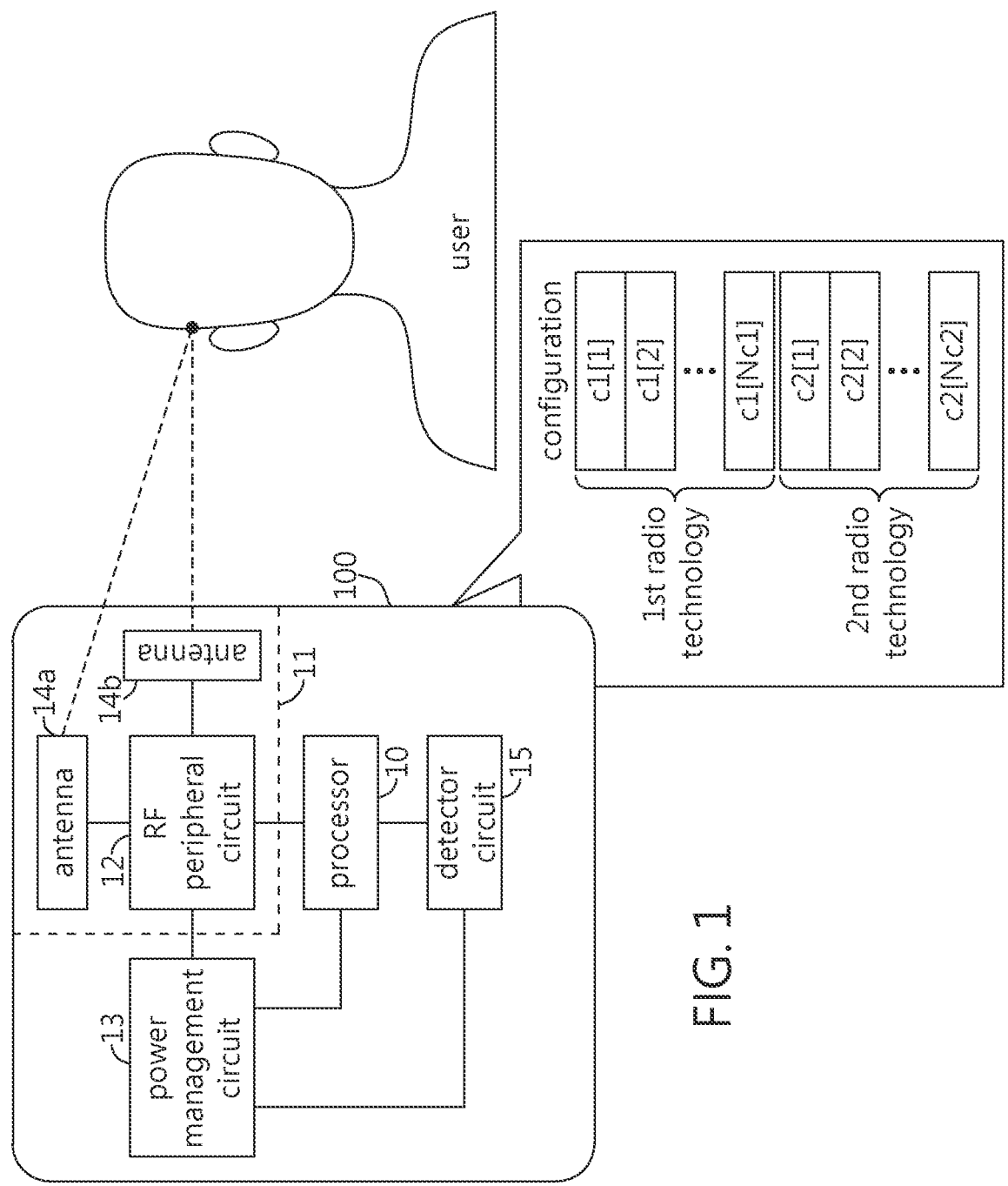
FIG. 1 depicts a UE according to an embodiment of the invention, which may own various configurations to transmit using different radio technologies.

FIG. 1 depicts a UE 100 according to an embodiment of the invention. The UE 100 may be a mobile phone, a smart phone, a tablet computer, a notebook computer, a drone, a digital camera, a camcorder, a wearable gadget, a virtualreality headset, a smart television, a projector, a video conference device, a game console, an internet of things (IoT) device, a smart voice-control speaker, a smart consumer electronic or an in-vehicle infotainment device, etc. As shown in FIG. 1, the UE 100 may comprise a processor 10, an RF portion 11, a power management circuit 13 and a detector circuit 15, wherein the RF portion 11 may include an RF peripheral circuit 12 and one or more antennas such as 14a and 14b.

The processor 10 may control operations of the UE 100. The RF peripheral circuit 12 may include (not shown for conciseness) RF frontend, RF transmitter(s), RF power amplifier(s) and RF receiver(s), etc. The RF peripheral circuit 12 may receive digital signals from the processor 10, may convert the digital signals to RF signals, and may feed the antennas 14a and/or 14b to transmit the RF signals. Also, the RF peripheral circuit 12 may convert RF signals received by the antennas 14a and/or 14b to digital signals, and send the digital signals to the processor 10. The detector circuit 15 may include one or more detectors and/or sensors, such as an orientation detector which may detect orientation of the UE 100, and/or a proximity sensor which may sense a distance between user and the UE 100. The power management circuit 13 may control power supplied to internal circuitry of the UE 100, including the processor 10, the RF portion 11 and the detector circuit 15.

The RF portion 11 may be designed to support various configurations to transmit using various radio technologies under various scenarios, wherein the various radio technologies may be different in how RF exposure is quantified, the various configurations may be different in antenna, band, beam, technology, sub-band, one or more exposure condition indices, simultaneous transmitted state, MCC and/or MNC, modulation, bandwidth, MPR, path, duty cycle, and/or combination of band and SIM, etc., and the various scenarios may be different in one or more transmitting performance indices, one or more receiving performance indices, one or more of the configurations and/or proximity between user and the UE, etc. In an embodiment, the various radio technologies may be cataloged to a first radio technology and a second radio technology; one of the first and second radio technologies may cover one or more wireless technologies which quantify RF exposure by SAR, and the other one of the first and second radio technologies may cover one or more wireless technologies which quantify RF exposure by PD. Detection of the detector circuit 150 (FIG. 1) may reflect the scenario of the first radio technology (referred to as first-radio scenario hereinafter) and the scenario of the second radio technology (referred to as second-radio scenario hereinafter). In an embodiment, the one or more transmitting performance indices may relate to duty cycle of transmitting, EVM of transmitting, target power, throughput, MCS, BLER, RB, TBS and/or latency, etc. In an embodiment, the one or more receiving performance indices may relate to duty cycle of receiving, SINR of receiving, MCS, RSSI and/or RSRP, etc.

As shown in FIG. 1, in an embodiment, the RF portion 11 may support a number Nc1 (e.g., an integer constant greater than or equal to one) of configurations c1[1] to c1[Nc1] (also referred to as first-radio configurations) to transmit using the first radio technology, and may support a number Nc2 (e.g., an integer constant greater than or equal to one) of configurations c2[1] to c2[Nc2] (also referred to as second-radio configurations) to transmit using the second radio technology. According to requirements of transmission, the RF portion 11 may adopt one, some or all of the first-radio configurations c1[1] to c1[Nc1] to transmit using the first radio technology, and may adopt one, some or all of the second-radio configurations c2[1] to c2[Nc2] to transmit using the second radio technology.

The configuration(s) possible to be adopted may vary with time. For example, it is assumed that the first-radio configurations c1[1] to c1[Nc1] includes configurations c1[1] to c1[6], wherein the configurations c1[1] and c1[4] may support transmission at a first band of the first radio technology, the configuration c1[2] may support transmission at a second band of the first radio technology, and the configurations c1[3], c1[5] and c1[6] may support transmission at a third band of the first radio technology. Accordingly, when the UE 100 communicates with a first remote participant (e.g., a serving base station or another UE, not shown) during a first time interval, if the first remote participant supports communication at the first and second bands of the first radio technology, then a subset {c1[1], c1[2], c1[4]} of the first-radio configurations c1[1] to c1[Nc1] is possible to be adopted during the first time interval, while another subset {c1[3], c1[5], c1[6]} of the first-radio configurations c1[1] to c1[Nc1] is not possible to be adopted during the first time interval. Similarly, when the UE 100 communicates with a second remote participant during a second time interval, if the second remote participant supports communication at the second and third bands of the first radio technology, then a subset {c1[2], c1[3], c1[5], c1[6]} of the first-radio configurations c1[1] to c1[Nc1] is possible to be adopted during the second time interval, while another subset {c1[1], c1[4]} of the first-radio configurations c1[1] to c1[Nc1] is not possible to be adopted during the second time interval. In other words, the subset of the first-radio configurations c1[1] to c1[Nc1], which is possible to be adopted, changes from {c1[1], c1[2], c1[4]} to {c1[2], c1[3], c1[5], c1[6]} when time elapses from the first time interval to the second time interval.

Different configurations, of different radio technologies or the same radio technology, may cause different effects on RF exposure. For example, as shown in FIG. 1, because the antenna 14a is farther from user comparing to the antenna 14b, the antenna 14a will cause less RF exposure than the antenna 14b even if the two antennas 14a and 14b are transmitting the same amount of power using the same radio technology. That is, a configuration using the antenna 14a to transmit and another configuration using the antenna 14b to transmit may contribute different weights on transmission power when causing RF exposure.

Figure 2:
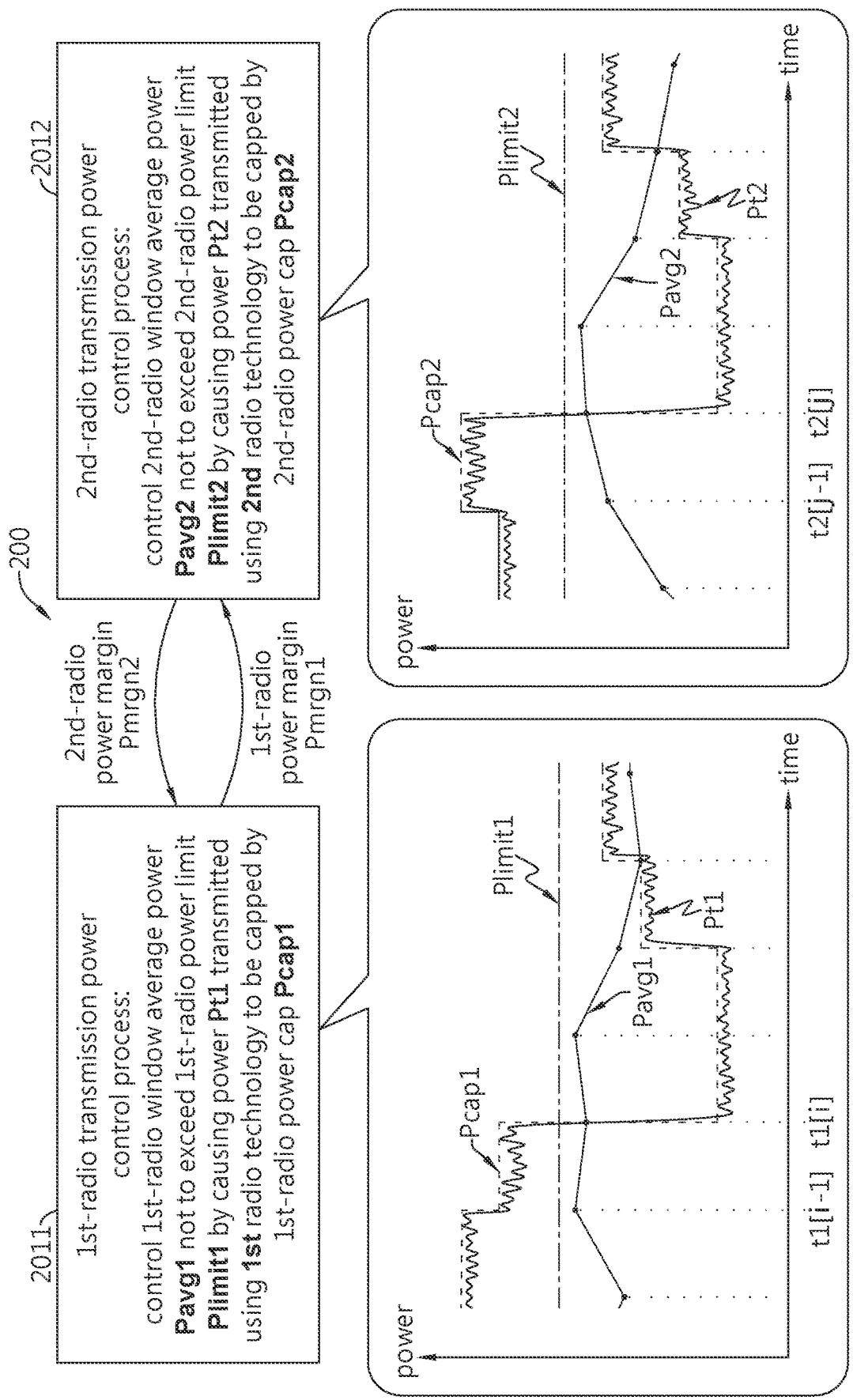
FIG. 2 depicts a method according to an embodiment of the invention, which may involve controlling a window average power not to exceed a power limit by causing transmission power to be capped by a power cap.

FIG. 2 depicts a method 200 according to an embodiment of the invention; the method 200 may be executed by the UE 100 (FIG. 1), such as the processor 10 and/or the power management circuit 13. The method 200 may comprise a first-radio transmission power control process 2011 and a second-radio transmission power control process 2012. To comply with regulations of RF exposure, the first-radio transmission power control process 2011 may control a first-radio window average power Pavg1, which may reflect average power transmitted using the first radio technology during a moving time window, not to exceed a first-radio power limit Plimit1 by causing power (e.g., instantaneous power) Pt1 transmitted using the first radio technology (referred to as first-radio transmission power Pt1 hereinafter) to be capped by a first-radio power cap Pcap1, and the second-radio transmission power control process 2012 may control a second-radio window average power Pavg2, which may reflect average power transmitted using the second radio technology during a moving time window, not to exceed a second-radio power limit Plimit2 by causing power Pt2 (e.g., instantaneous power) transmitted using the second radio technology (referred to as second-radio transmission power Pt2) to be capped by a second-radio power cap Pcap2.

The first-radio transmission power control process 2011 and the second-radio transmission power control process 2012 may have mutual interaction, and may therefore comprehensively deal with RF exposure caused by both the first and second radio technologies. As will be further explained later, in an embodiment, the first-radio power limit Plimit1 of the first-radio transmission power control process 2011 may be determined according to first-radio power limit decision factor(s) including a second-radio power margin Pmrgn2, which may result from the second-radio transmission power control process 2012; in an embodiment, the second-radio power limit Plimit2 of the second-radio transmission power control process 2012 may be determined according to second-radio power limit decision factor(s) including a first-radio power margin Pmrgn1, which may result from the first-radio transmission power control process 2011.

Figure 3B:
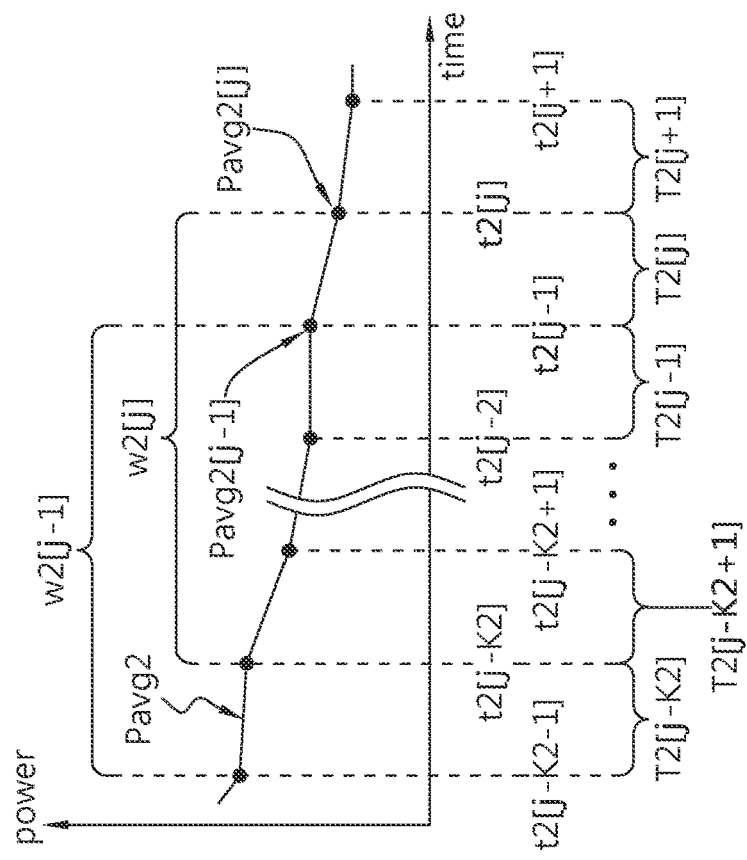
FIGS. 3*a* and 3*b* depict moving time window of the window average power.
Figure 3A:
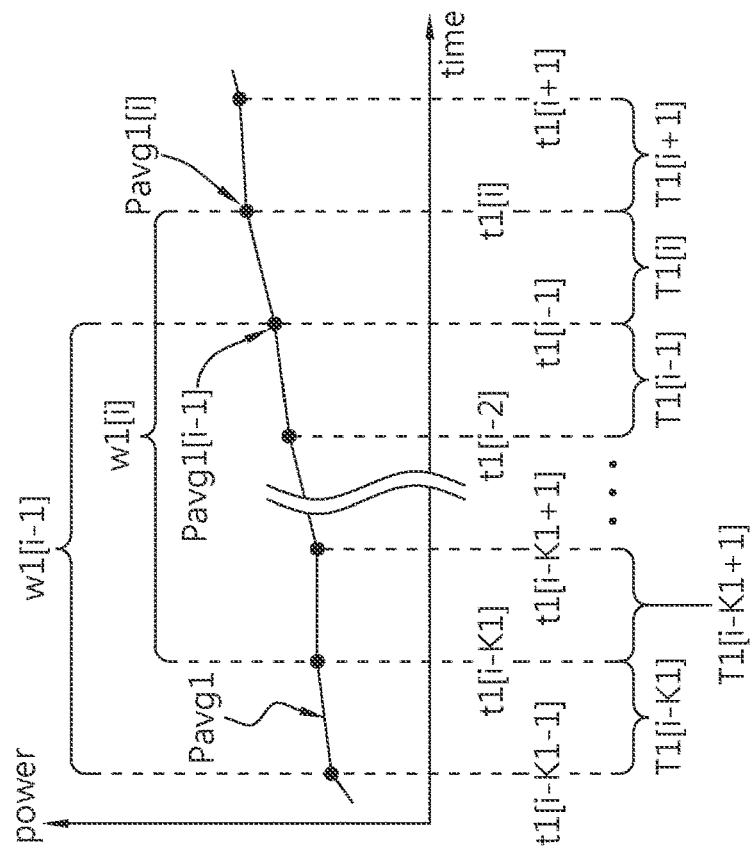

FIG. 3a depicts moving time window of the first-radio window average power Pavg1. At a time t1[$i$], a sample value of the first-radio window average power Pavg1, referred to as first-radio window average power Pavg1[$i$] of the time t1[$i$], may be averaged over a time window w1[$i$] from a time t1[$i$−K1] to the time t1[$i$], so the first-radio window average power Pavg1[$i$] of the time t1[$i$] may reflect average power transmitted using the first radio technology during the time window w1[$i$]. The time window w1[$i$] may cover a number K1 (e.g., a constant integer greater than one) of periods T1[$i$−K1+1] to T1[$i$], wherein the periods T1[$i$−K1+1] to T1[$i$] may respectively be time intervals between every consecutive two of the times t1[$i$−K1], t1[$i$−K1+1], . . . , t1[$i$−1] to t1[$i$]. Similarly, the first-radio window average power Pavg1[$i$−1] of the time t1[$i$−1] may be averaged over a time window w1[$i$−1] from a time t1[$i$−K1−1] to the time t1[$i$−1], covering number K1 of periods T1[$i$−K1] to T1[$i$−1].

FIG. 3b depicts moving time window of the second-radio window average power Pavg2. At a time t2[$j$], a sample value of the second-radio window average power Pavg2, referred to as second-radio window average power Pavg2[$j$] of the time t2[$j$], may be averaged over a time window w2[$j$] from a time t2[$j$−K2] to the time t2[$j$], so the second-radio window average power Pavg2[$j$] of the time t2[$j$] may reflect average power transmitted using the second radio technology during the time window w2[$j$]. The time window w2[$j$] may cover a number K2 (e.g., a constant integer greater than one) of periods T2[$j$−K2+1] to T2[$j$], wherein the periods T2[$j$−K2+1] to T2[$j$] may respectively be time intervals between every consecutive two of the times t2[$j$−K2], t2[$j$−K2+1], . . . , t2[$j$−1] to t2[$j$]. Similarly, the second-radio window average power Pavg2[$j$−1] of the time t2[$j$−1] may be averaged over a time window w2[$j$−1] from a time t2[$j$−K2−1] to the time t2[$j$−1], covering number K2 of periods T2[$j$−K2] to T2[$j$−1].

Duration of the windows w1[$i$] and w2[$j$] may be in a scale of second or minute, e.g., be in a range from one to hundreds of seconds. Duration of the periods t1[$i$] and t2[$j$] may be in a scale of millisecond or microsecond, e.g., be in a range from one to millions of microseconds. Duration of the periods T1[$i$] and T2[$j$] may be substantially the same or different. Duration of the windows w1[$i$] and w2[$j$] may be the same or different. The numbers K1 and K2 may be the same or different. The time t1[$i$] may be earlier or later than the time t2[$j$], or be coincident with the time t2[$j$].

Figure 4:
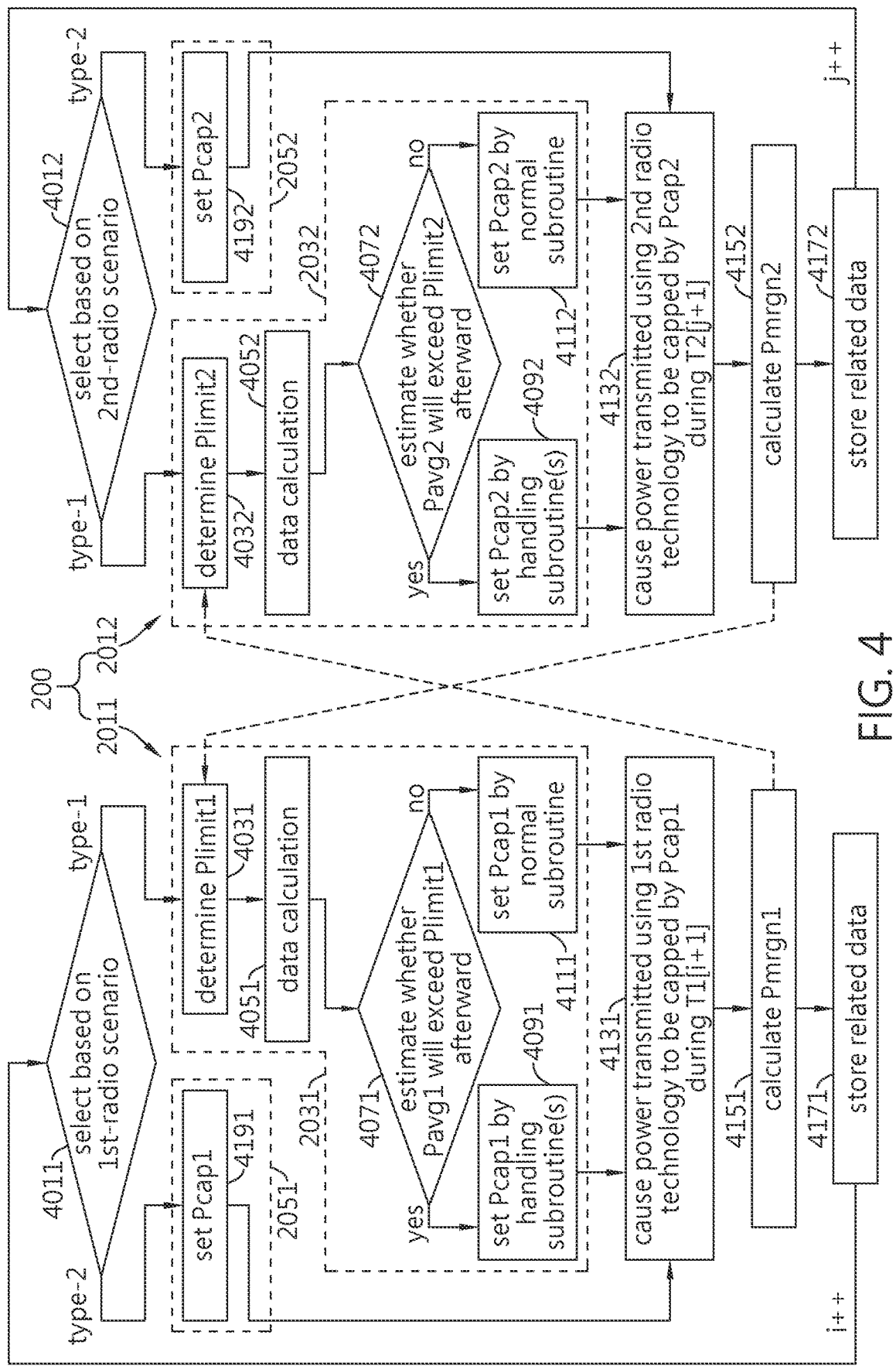
FIG. 4 depicts steps of the method shown in FIG. 2; the method may comprise two transmission power control processes for two radio technologies, each transmission power control process may comprise steps of determining the power limit, calculating data, estimating whether the window average power will exceed the power limit at a future time, setting the power cap, calculating a power margin, etc., and may accordingly implement different control procedures.

FIG. 4 depicts further details of the method 200. The first-radio transmission power control process 2011 may include steps 4011, 4031, 4051, 4071, 4091, 4111, 4131, 4151, 4171 and 4191; the second-radio transmission power control process 2012 may include steps 4012, 4032, 4052, 4072, 4092, 4112, 4132, 4152, 4172 and 4192. Steps 4031, 4051, 4071, 4091 and 4111 may function as a first-radio type-one control procedure 2031, while step 4191 may function as a first-radio type-two control procedure 2051. Steps 4032, 4052, 4072, 4092 and 4112 may function as a second-radio type-one control procedure 2032, while step 4192 may function as a second-radio type-two control procedure 2052. In an embodiment, the first-radio type-one control procedure 2031 and the second-radio type-one control procedure 2032 may follow the same operation principle. In an embodiment, the first-radio type-two control procedure 2051 and the second-radio type-two control procedure 2052 may follow the same operation principle.

In the first-radio transmission power control process 2011, step 4011 may comprise: based on the first-radio scenario, selecting whether to proceed to step 4031 of the first-radio type-one control procedure 2031, or to step 4191 of the first-radio type-two control procedure 2051. For example, in response to a first-radio scenario which needs higher throughput, step 4011 may proceed to step 4031 of the first-radio type-one control procedure 2031; in response to a first-radio scenario which needs MCS that is sensitive to noise, step 4011 may proceed to step 4191 of the first-radio type-two control procedure 2051; in response to a first-radio scenario where the UE 100 needs to compete with other user equipments for more RF resources (e.g., bandwidth), step 4011 may proceed to step 4031 of the first-radio type-one control procedure 2031.

In the first-radio type-one control procedure 2031, step 4031 may start substantially at the time t1[$i$] (FIG. 3a), and may include: determining a current value of the first-radio power limit Plimit1 according to one or more first-radio power limit decision factors. In an embodiment, the first-radio power limit decision factor(s) may reflect a current subset Uc1[$i$] of the configurations c1[1] to c1[Nc1] (FIG. 1) which is possible to be adopted at the time t1[$i$]; for example, step 4031 may determine the current value of the first-radio power limit Plimit1 according to the current subset Uc1[$i$] of the configurations c1[1] to c1[Nc1]. In an embodiment, the first-radio power limit decision factor(s) may further include the second-radio power margin Pmrgn2 (FIG. 2); for example, step 4031 may determine the current value of the first-radio power limit Plimit1 jointly according to the second-radio power margin Pmrgn2 (FIG. 2) and the subset Uc1[$i$] of the configurations c1[1] to c1[Nc1]. The second-radio power margin Pmrgn2 may result from step 4152 of the second-radio transmission power control process 2012.

Figure 5:
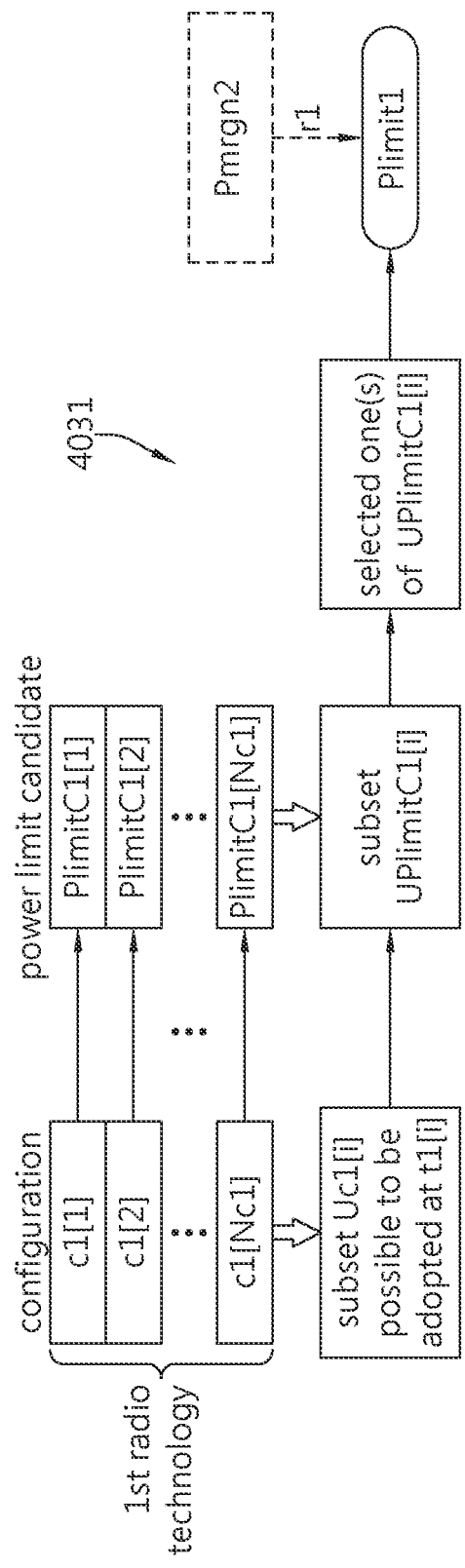
FIGS. 5 and 13 depict operation of determining the power limit according to an embodiment of the invention.

FIG. 5 depicts operation of step 4031 according to an embodiment of the invention. As mentioned previously (e.g., FIG. 1), the RF peripheral circuit 12 of the UE 100 may support the configurations c1[1] to c1[Nc1] of the first radio technology. At the time t1[$i$], one, some or all of the configurations c1[1] to c1[Nc1] is/are possible to be adopted, and said one, some or all of the configurations c1[1] to c1[Nc1] possible to be adopted at time t1[$i$] may form the subset Uc1[$i$] of the configurations c1[1] to c1[Nc1].

To implement the invention, the configurations c1[1] to c1[Nc1] may be associated with predefined power limit candidates PlimitC1[1] to PlimitC1[Nc1] respectively. As previously described, different configurations may cause different effects on RF exposure, and the power limit candidates PlimitC1[$n$], for n=1 to Nc1, may reflect the effects (weight) of the associated configuration c1[$n$]. For example, a configuration utilizing the antenna 14a (FIG. 1) to transmit may be associated with a power limit candidate of a higher value, while another configuration utilizing the antenna 14b to transmit may be associated with a power limit candidate of a lower value.

Because the configurations c1[1] to c1[Nc1] may be associated with the power limit candidates PlimitC1[1] to PlimitC1[Nc1] respectively, the current subset Uc1[i] of the configurations c1[1] to c1[Nc1] will be associated with a current subset UPlimitC1[i] of the power limit candidates PlimitC1[1] to PlimitC1[Nc1]. Therefore, in an embodiment, the first-radio power limit decision factor(s) may include selected one or ones of the subset UPlimitC1[i] of the power limit candidates PlimitC1[1] to PlimitC1[Nc1], and/or other first-radio auxiliary data which may include predefined value(s) and/or calculated value(s) not depicted; for example, step 4031 may determine the current value of the first-radio power limit Plimit1 according to the selected one or ones of the subset UPlimitC1[i] of the power limit candidates PlimitC1[1] to PlimitC1[Nc1], and/or the first-radio auxiliary data. In another embodiment, the first-radio power limit decision factor(s) may further include the second-radio power margin Pmrgn2 besides the selected one or ones of the subset UPlimitC1[i] of the power limit candidates PlimitC1[1] to PlimitC1[Nc1] and/or the first-radio auxiliary data; for example, step 4031 may determine the current value of the first-radio power limit Plimit1 jointly according to the second-radio power margin Pmrgn2, the selected one(s) of the subset UPlimitC1[i] of the power limit candidates PlimitC1[1] to PlimitC1[Nc1], and/or the first-radio auxiliary data. For example, if the subset Uc1[i] of the configurations c1[1] to c1[Nc1] is {c1[2], c1[3], c1[5], c1[6]}, then the subset UPlimitC1[i] of the power limit candidates PlimitC1[1] to PlimitC1[Nc1] will be {PlimitC1[2], PlimitC1[3], PlimitC1[5], PlimitC1[6]}, and the selected one(s) of the subset UPlimitC1[i] of the power limit candidates PlimitC1[1] to PlimitC1[Nc1] may be one(s) of the power limit candidates PlimitC1[2], PlimitC1[3], PlimitC1[5] and PlimitC1[6].

In an embodiment, step 4031 may determine the first-radio power limit Plimit1 by setting the first-radio power limit Plimit1 to substantially equal a selected one of the subset UPlimitC1[i] of the power limit candidates PlimitC1[1] to PlimitC1[Nc1], or (a selected one of) the first-radio auxiliary data. In a different embodiment, determining the current value of the first-radio power limit may include: scaling selected one(s) of the current subset UPlimitC1[i] of the power limit candidates PlimitC1[1] to PlimitC1[Nc1] and/or the first radio auxiliary data by a ratio determined according to the second-radio power margin; for example, step 4031 may determine the first-radio power limit Plimit1 by setting the first-radio power limit Plimit1 to substantially equal a result of scaling a selected one of the subset UPlimitC1[i] of the power limit candidates PlimitC1[1] to PlimitC1[Nc1] or (a selected one of) the first-radio auxiliary data by a ratio r1. The ratio r1 may be a value less than or equal to one, and may be positively correlated to the second-radio power margin Pmrgn2. For example, as the second-radio power margin Pmrgn2 is larger, the ratio r1 may be larger and closer to one.

The value of the first-radio power limit Plimit1 may change with time. For example, the current value and a preceding value of the first-radio power limit Plimit1 may be different if the current subset Uc1[i] of the configurations c1[1] to c1[Nc1], which is possible to be adopted at the time t1[i], is different from a preceding subset Uc1[i−1] of the configurations c1[1] to c1[Nc1], which is possible to be adopted at the preceding time t1[i−1]. And/or, the current value and the preceding value of the first-radio power limit Plimit1 may be different if a current value of the second-radio power margin Pmrgn2 is different from a preceding value of the second-radio power margin Pmrgn2.

Figure 6:
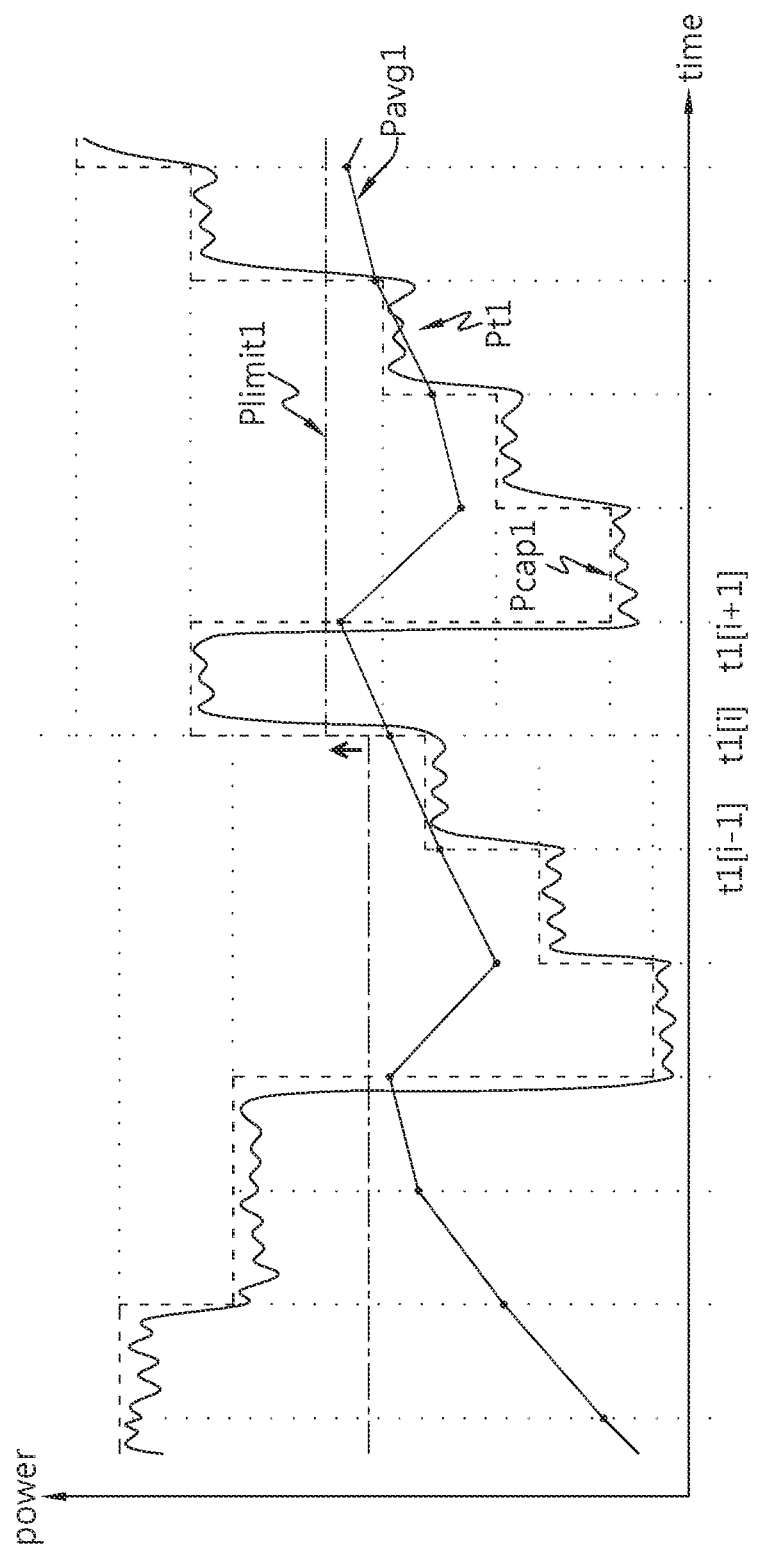
FIGS. 6 and 14 depict change of the power limit.

FIG. 6 depicts an example that the first-radio power limit Plimit1 changes (increases in the depicted example) at the time t1[i]; as the first-radio power limit Plimit1 updates to a higher value after the time t1[i], the first-radio transmission power control process 2011 (FIG. 2) may control the first-radio window average power Pavg1 not to exceed the updated first-radio power limit Plimit1 by causing the first-radio power transmission Pt1 to be capped below the first-radio power cap Pcap1. The first-radio power limit Plimit1 may be higher if the subset Uc1[i] of the configurations c1[1] to c1[Nc1], which is possible to be adopted at the time t1[i], causes weaker effects (weights) on RF exposure comparing to the preceding subset Uc1[i−1] of the configurations c1[1] to c1[Nc1], which is possible to be adopted at the time t1[i−1]. And/or, the first-radio power limit Plimit1 may be higher if the second-radio power margin Pmrgn2 becomes higher.

Back to FIG. 4, step 4051 may comprise data calculation, such as calculating the first-radio window average power Pavg1[i] of the time t1[i].

Figure 7:
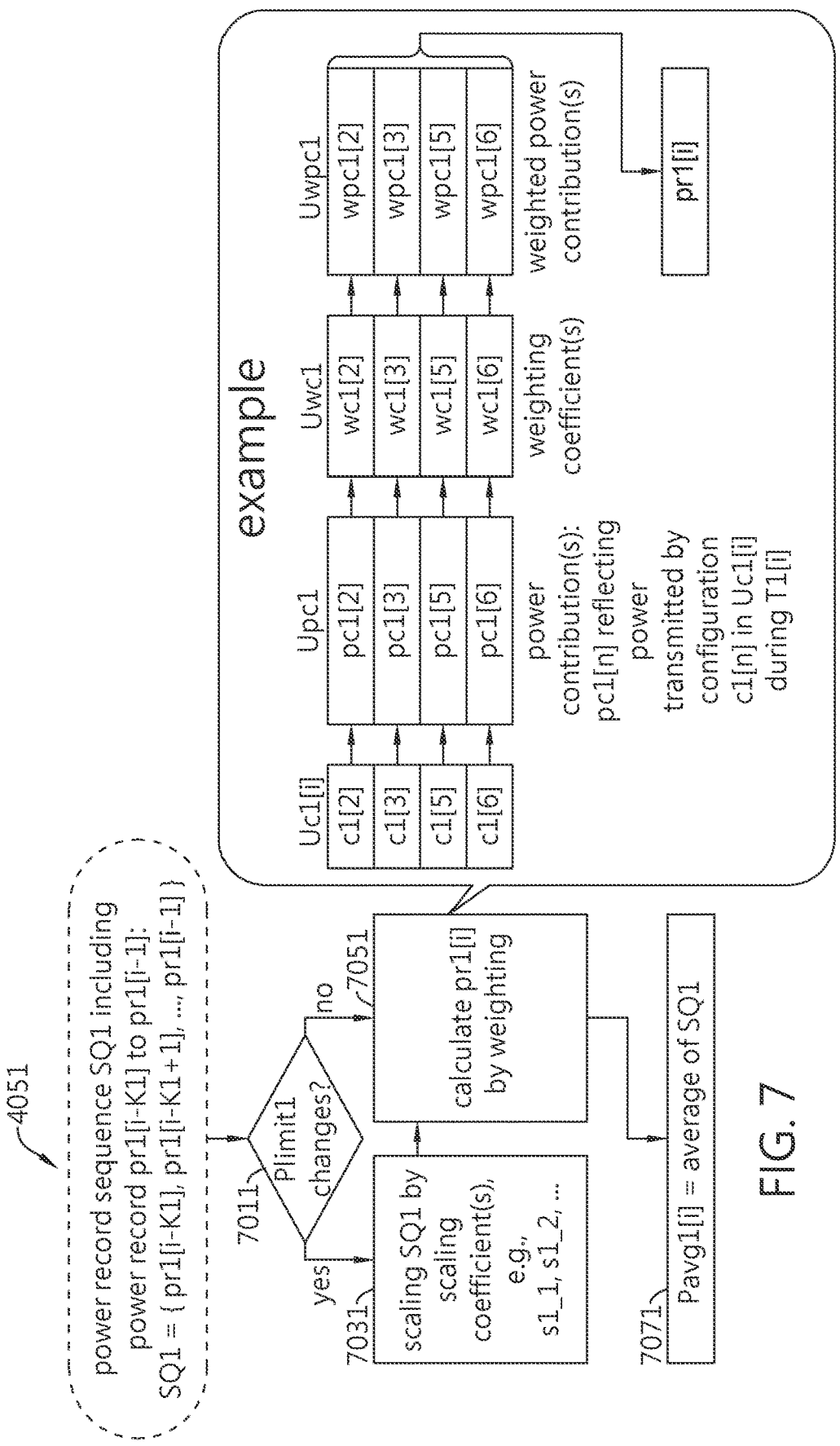
FIGS. 7 and 15 depict operation of calculating data according to an embodiment of the invention.

FIG. 7 depicts details of step 4051 according to an embodiment of the invention. Step 4051 may comprise steps 7011, 7031, 7051 and 7071.

Step 7011 may start with an existed power record sequence SQ1; the power record sequence SQ1 may include number K1 of power records pr1[i−K1], pr1[i−K1+1], . . . , pr1[i−1], e.g., SQ1={pr1[i−K1], . . . , pr1[i−1]}. The power records pr1[i−K1] to pr1[i−1] may reflect average power transmitted using the first radio technology during the past periods T1[i−K1] to T1[i−1], respectively.

Step 7011 may comprise: checking whether the first-radio power limit Plimit1 changes by comparing whether the current value of the first-radio power limit Plimit1 is different from the preceding value of the first-radio power limit Plimit1; if the first-radio power limit Plimit1 does not change, proceeding to step 7051; if the first-radio power limit Plimit1 changes, proceeding to step 7031.

Step 7031 may comprise: if the first-radio power limit Plimit1 changes, scaling each one of the power records pr1[i−K1] to pr1[i−1] of the power record sequence SQ1 by one or more scaling coefficients, e.g., s1_1, s1_2, . . . , etc., to update the power record sequence SQ1, and then proceeding to step 7051. That is, in the updated power record sequence SQ1, an updated value of each power record pr1[#], for #=(i−K1) to (i−1), may substantially equal a result of scaling a before-update value of the power record pr1[#] by the one or more scaling coefficients s1_1, s1_2, etc.

In an embodiment, at least one of the one or more scaling coefficients s1_1, s1_2, etc. may relate to the current value of the first-radio power limit Plimit1 and/or the preceding value of the first-radio power limit Plimit1, e.g., may be positively correlated to the current value of the first-radio power limit Plimit1, and/or may be negatively correlated to the preceding value of the first-radio power limit Plimit1. Therefore, if the first-radio power limit Plimit1 changes (step 7011), at least one of the scaling coefficient(s) s1_1 etc. may be less than one or greater than one. By scaling of the scaling coefficient(s) s1_1 etc. when the first-radio power limit Plimit1 changes from the preceding value to the current value, the power records pr1[i−K1] to pr1[i−1] of the updated power record sequence SQ1 may adapt the current value of the first-radio power limit Plimit1, and may therefore align with (be comparable to) the current value of the first-radio power limit Plimit1.

Step 7051 may comprise: calculating a current power record pr1[$i$], which may reflect average power transmitted using the first radio technology during the period T1[$i$], and proceeding to step 7071. As mentioned earlier (e.g., FIG. 5), one, some or all of the configurations c1[1] to c1[Nc1], which is/are possible to be adopted at the time t1[$i$], may form the current subset Uc1[$i$] of the configurations c1[1] to c1[Nc1]. Hence, when the RF peripheral circuit 12 transmits power using the first radio technology during the period T1[$i$], the current subset Uc1[$i$] of the configurations c1[1] to c1[Nc1] may further be associated with a collection Upc1 of power contributions, wherein each configuration c1[$n$] of the current subset Uc1[$i$] of the configurations c1[1] to c1[Nc1] may be associated with a power contribution pc1[$n$] of the collection Upc1 of power contributions, and the power contribution pc1[$n$] may reflect average power transmitted by the associated configuration c1[$n$] during the period T1[$i$].

In addition, the current subset Uc1[$i$] of the configurations c1[1] to c1[Nc1] may further be associated with a collection Uwc1 of weighting coefficients, wherein each configuration c1[$n$] of the current subset Uc1[$i$] of the configurations c1[1] to c1[Nc1] may be associated with a weighting coefficient wc1[$n$] of the collection Uwc1 of weighting coefficients; in an embodiment, the weighting coefficient wc1[$n$] may relate to (e.g., be positively correlated to) the current value of the first-radio power limit Plimit1, and/or may relate to (e.g., be negatively correlated to) the associated power limit candidate PlimitC1[$n$].

Accordingly, step 7051 may weight the collection Upc1 of power contributions respectively by the collection Uwc1 of weighting coefficients to form a collection Uwpc1 of weighted power contributions, and may calculate the current power record pr1[$i$] according to (e.g., by summarizing over) the collection Uwpc1 of weighted power contributions. FIG. 7 also shows an example demonstrating operation of step 7051; in the example, the current subset Uc1[$i$] of the configurations c1[1] to c1[Nc1] is {c1[2], c1[3], c1[5], c1[6]}, so the collection Upc1 of power contributions may be {pc1[2], pc1[3], pc1[5], pc1[6]}, the collection Uwc1 of weighting coefficients may be {wc1[2], wc1[3], wc1[5], wc1[6]}, and the collection Uwpc1 of weighted power contributions may be {wpc1[2], wpc1[3], wpc1[5], wpc1[6]}. The current power record pr1[$i$] may then be calculated according to the collection Uwpc1 of weighted power contributions {wpc1[2], wpc1[3], wpc1[5], wpc1[6]}. The power contributions pc1[2], pc1[3], pc1[5] and pc1[6] may respectively reflect average power transmitted by the configurations c1[2], c1[3], c1[5] and c1[6] during the period T1[$i$].

As previously mentioned, two different configurations may have different effects (weights) on RF exposure, and may therefore cause different amounts of RF exposure even if amounts of power transmitted by the two different configurations are the same. By the collection Uwc1 of weighting coefficients, step 4051 may take different effects of different configurations into consideration.

By discarding the power record pr1[$i$−K1] from the power record sequence SQ1 and appending the current power record pr1[$i$] to the power record sequence SQ1, the power record sequence SQ1 may be updated to include the power records pr1[$i$−K1+1] to pr1[$i$], e.g., SQ1={pr1[$i$−K1+1], . . . , pr1[$i$]}.

Step 7071 may comprise: calculating the first-radio window average power Pavg1[$i$] of the current time t1[$i$] by an average of the power record sequence SQ1. In the power record sequence SQ1, the power records pr1[$i$−K1+1] to pr1[$i$] may respectively reflect average power transmitted using the first radio technology during the periods T1[$i$−K1+1] to T1[$i$] (FIG. 3$a$), so average of the power record sequence SQ1, i.e., average of the power records pr1[$i$−K1+1] to pr1[$i$], may reflect the first-radio window average power Pavg1[$i$] of the time t1[$i$].

Figure 8:
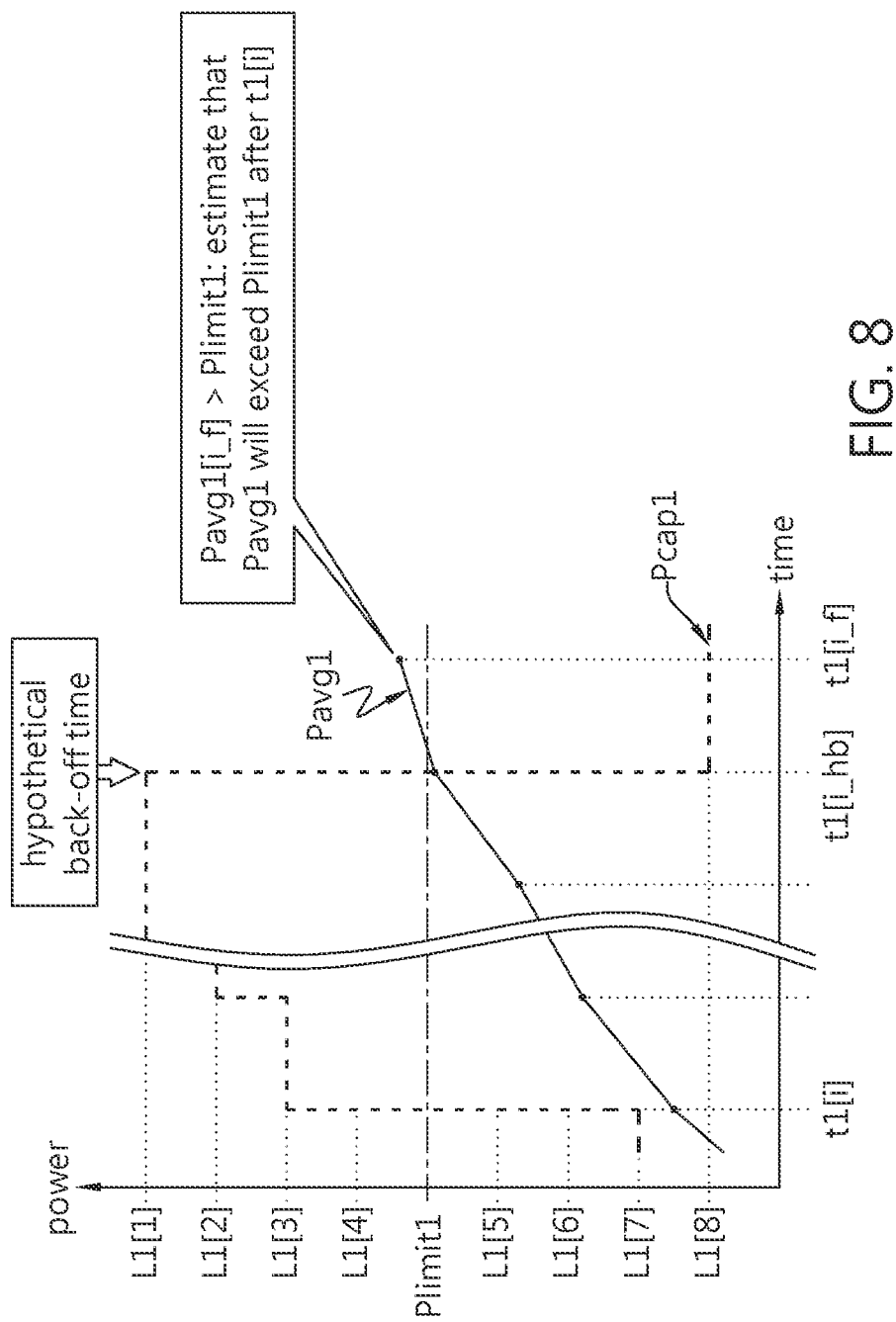
FIGS. 8 and 16 depict operation of estimating whether the window average power will exceed the power limit.

Back to FIG. 4, after step 4051, step 4071 may comprise: (substantially) at the time t1[$i$], estimating whether the first-radio window average power Pavg1 will exceed the first-radio power limit Plimit1 after the time t1[$i$]; if it is estimated that the first-radio window average power Pavg1 will exceed the first-radio power limit Plimit1 after the time t1[$i$], proceeding to step 4091; if it is estimated that the first-radio window average power Pavg1 will not exceed the first-radio power limit Plimit1 after the time t1[$i$], proceeding to step 4111. FIG. 8 depicts an example demonstrating operation of step 4071. At step 4071, estimating whether the first-radio window average power Pavg1 will exceed the first-radio power limit Plimit1 after the time t1[$i$] may comprise: by assuming that the first-radio power cap Pcap1 is lowered at a hypothetical back-off time t1[$i\_hb$], calculating the first-radio window average power Pavg1[$i\_f$] of a future time t1[$i\_f$], wherein the hypothetical back-off time t1[$i\_hb$] may not be earlier than the time t1[$i$], and the future time t1[$i\_f$] may be later than the hypothetical back-off time t1[$i\_hb$]; if the first-radio window average power Pavg1[$i\_f$] of the future time t1[$i\_f$] exceeds the first-radio power limit Plimit1 (as shown in FIG. 8), estimating that the first-radio window average power Pavg1 will exceed the first-radio power limit Plimit1 after the time t1[$i$].

As shown in FIG. 8, in an embodiment, step 4071 may calculate the first-radio window average power Pavg1[$i\_f$] of the future time t1[$i\_f$] under an assumption that the first-radio power cap Pcap1 is in a first-radio high range (not depicted) between the times t1[$i$] and t1[$i\_hb$], and is lowered to be in a first-radio low range (not depicted) between the times t1[$i\_hb$] and t1[$i\_f$], wherein the first-radio high range and the first-radio low range may be different. In an embodiment, the first-radio high range may cover one or ones of predefined high levels, e.g., L1[1] to L1[4]; and/or, the first-radio high range may cover a sum of a first offset and a preceding value of the first-radio power cap Pcap1. In an embodiment, the first-radio low range may cover one or ones of predefined low levels, e.g., L1[5] to L1[8]; and/or, the first-radio low range may cover a sum of a second offset and the preceding value of the first-radio power cap Pcap1. In an embodiment, the first-radio high range may be higher than the first-radio power limit Plimit1; in an embodiment, the first-radio low range may be lower than the first-radio power limit Plimit1. In an embodiment, the high levels L1[1] to L1[4] may be higher than the first-radio power limit Plimit1, and the low levels L1[5] to L1[8] may be lower than the first-radio power limit Plimit1. In an embodiment, the future time t1[$i\_f$] may be a subsequent time t1[$i\_hb+1$] after the hypothetical back-off time t1[$i\_hb$].

Starting with an variable k equal to zero, step 4071 may conduct a computation operation to calculate the first-radio window average power Pavg1[$i+k+1$] of the time t1[$i+k+1$] under an assumption that the hypothetical back-off time and the future time are the times t1[$i+k$] and t1[$i+k+1$] respectively; according to whether the first-radio window average power Pavg1[$i+k+1$] exceeds the first-radio power limit Plimit1 or not, step 4071 may proceed to step 4091 (FIG. 4), or may cycle back to said computation operation with the variable k incremented, until the variable k reaches an upper bound.

When calculating the first-radio window average power Pavg1[$i$+1] of the time t1[$i$+1] substantially at the time t1[$i$], step 4071 will need the power records pr1[$i$−K1+2] to pr1[$i$+1] respectively reflecting average power transmitted using the first radio technology during the periods T1[$i$−K1+2] to T1[$i$+1]. Step 4071 may obtain the existed power records pr1[$i$−K1+2] to pr1[$i$] from the power record sequence SQ1, which results from step 4051 (FIG. 4 and FIG. 7), by discarding the power record pr1[$i$−K1+1] from the power record sequence SQ1, and may estimate the currently non-existent power record pr1[$i$+1].

Figure 9:
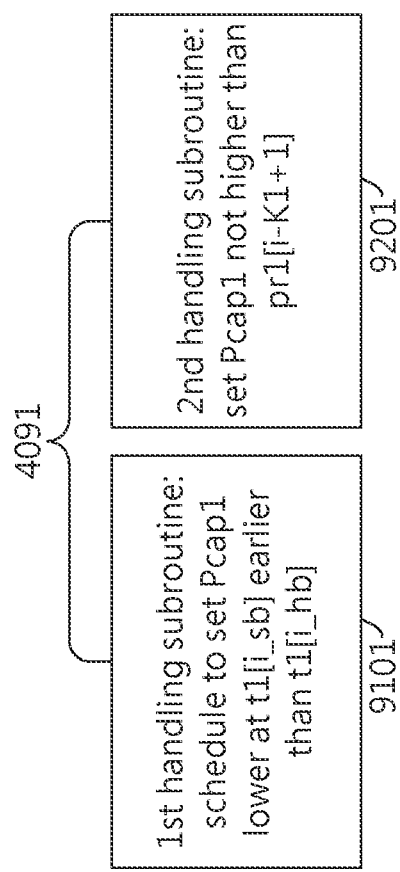
FIGS. 9 and 17 depict different handling subroutines when it is estimated that the window average power will exceed the power limit.

FIG. 9 depicts details of step 4091 (FIG. 4) according to an embodiment of the invention. Step 4091 may comprise: executing a first handling subroutine 9101 and/or a second handling subroutine 9201 to set the first-radio power cap Pcap1. As step 4071 (FIG. 4) estimates that lowering the first-radio power cap Pcap1 at the hypothetical back-off time t1[$i\_hb$] will still cause the first-radio window average power Pavg1 to exceed the first-radio power limit Plimit1 and therefore proceeds to step 4091, the first handling subroutine 9101 may comprise: (substantially) at the time t1[$i$], scheduling to set the first-radio power cap Pcap1 lower at a scheduled time t1[$i\_sb$] earlier than the hypothetical back-off time t1[$i\_hb$]. In an embodiment, the scheduled time t1[$i\_sb$] may be a preceding time t1[$i\_hb$−1] before the hypothetical back-off time t1[$i\_hb$]. In an embodiment, the scheduled time t1[$i\_sb$] may be later than the current time t1[$i$].

In an embodiment, besides scheduling to lower the first-radio power cap Pcap1 at the scheduled time t1[$i\_sb$], the first handling subroutine 9101 may further comprise: (substantially) at the current time t1[$i$], setting the first-radio power cap Pcap1 to one of the high levels L1[1] to L1[4], if the current time t1[$i$] is not previously scheduled to lowering the first-radio power cap Pcap1.

As estimation of step 4071 (FIG. 4) may involve discarding the power record pr1[$i$−K1+1] (e.g., when calculating the first-radio average power Pavg1[$i$+1] of the time t[$i$+1]), the second handling subroutine 9201 may comprise: (substantially) at the time t1[$i$], setting the first-radio power cap Pcap1 not higher than (e.g., substantially equal to) the power record pr1[$i$−K1+1], which may reflect average power transmitted using the first radio technology during the past period T1[$i$−K1+1] ended at the time t1[$i$−K1+1]. Calculating the first-radio window average power Pavg1[$i$+1] of the time t[$i$+1] may relate to a difference between the first-radio window average power Pavg1[$i$] of the time t1[$i$] and the first-radio window average power Pavg1[$i$+1] of the time t[$i$+1], and may therefore involve subtracting (discarding) the power record pr1[$i$−K1+1] and adding (appending) the power record pr1[$i$+1]. Therefore, by setting the first-radio power cap Pcap1 not to be higher than the subtracted (discarded) power record pr1[$i$−K1+1], the added (appended) power record pr1[$i$+1] may accordingly be not higher than the power record pr1[$i$−K1+1], and hence the first-radio window average power Pavg1[$i$+1] of the time t1[$i$+1] may keep substantially equal to or lower than the first-radio window average power Pavg1[$i$] of the time t1[$i$].

In an embodiment, the first and second handling subroutines 9101 and 9201 of step 4091 may both be utilized. At the time t1[$i$], if step 4071 (FIG. 4) estimates that the first-radio window average power Pavg1 will exceed the first-radio power limit Plimit1 at the subsequent time t1[$i$+1], step 4071 may proceed to the second handling subroutine 9201 of step 4091; if step 4071 (FIG. 4) estimates that the first-radio window average power Pavg1 will not exceed the first-radio power limit Plimit1 at the time t1[$i$+1] but will exceed the first-radio power limit Plimit1 after the time t1[$i$+1], step 4071 may proceed to the first handling subroutine 9101 of step 4091.

Figure 10:
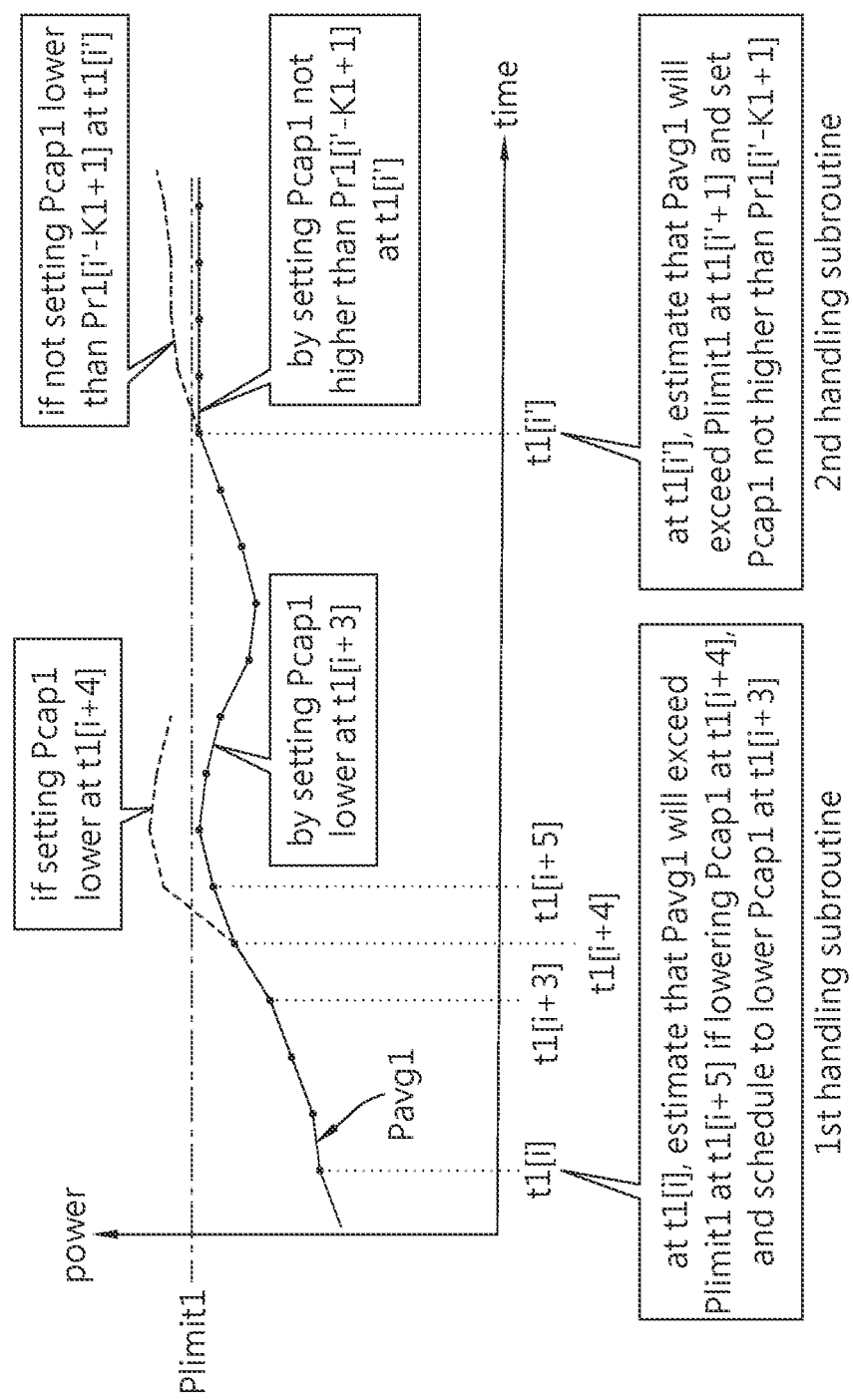
FIG. 10 depicts cooperation of the handling subroutines.

FIG. 10 depicts an example demonstrating cooperation of the first and the second handling subroutine 9101 and 9201 of step 4091. As shown in FIG. 10, at the time t1[$i$], step 4071 estimates that the first-radio window average power Pavg1 will exceed the first-radio power limit Plimit1 at the time t1[$i$+5] if the first-radio power cap Pcap1 is lowered at the time t1[$i$+4], so step 4071 may proceed to the first handling subroutine 9101, and the first handling subroutine 9101 may schedule to set the first-radio power cap Pcap1 lower earlier at the time t1[$i$+3]. By setting the first-radio power cap Pcap1 lower at the time t1[$i$+3] earlier than the time t1[$i$+4], the first-radio window average power Pavg1 (illustrated by solid line) will stay below the first-radio power limit Plimit1. On the other hand, if the first-radio power cap Pcap1 is set lower at the time t1[$i$+4], the first-radio window average power Pavg1 (illustrated by dash line) will exceed the first-radio power limit Plimit1 after the time t1[$i$+4].

As shown in FIG. 10, at a time t1[$i'$], step 4071 estimates that the first-radio window average power Pavg1 will exceed the first-radio power limit Plimit1 at the time t1[$i'$+1] if the first-radio power cap Pcap1 is lowered at the time t1[$i'$], so step 4071 may proceed to the second handling subroutine 9201, and the second handling subroutine 9201 may set the first-radio power cap Pcap1 not to be higher than the power record pr1[$i'$−K1+1] at the time t1[$i'$]. By setting the first-radio power cap Pcap1 not higher than the power record pr1[$i'$−K1+1] at the time t1[$i'$], the first-radio window average power Pavg1 (illustrated by solid line) will stay below the first-radio power limit Plimit1. On the other hand, if the first-radio power cap Pcap1 is not set lower than the power record pr1[$i'$−K1+1] at the time t1[$i'$], the first-radio window average power Pavg1 (illustrated by dash line) will not stay below the first-radio power limit Plimit1.

Figures 11, 12:
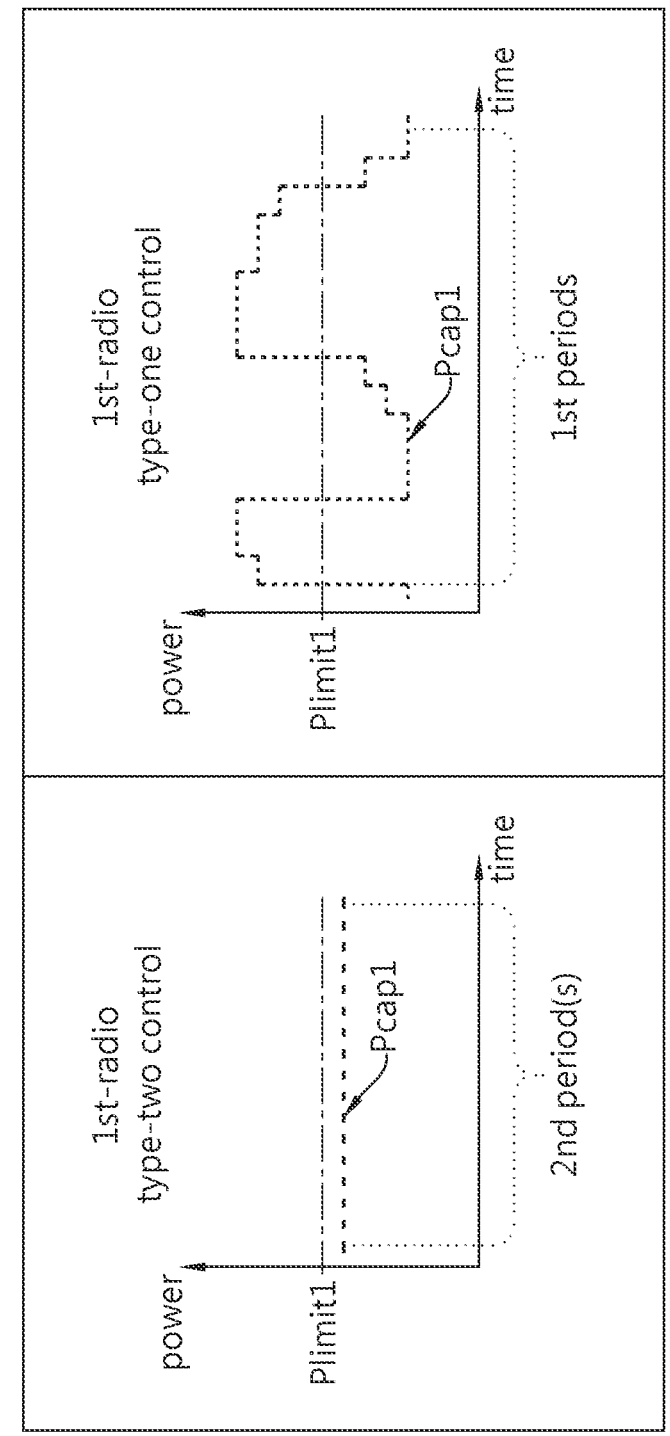

Back to FIG. 4, if step 4071 estimates that the first-radio window average power Pavg1 will not exceed the first-radio power limit Plimit1 after the time t1[$i$], step 4071 may proceed to step 4111. Step 4111 may set the first-radio power cap Pcap1 by a normal subroutine, which may comprise: (if the current time t1[$i$] is not previously scheduled to lower the first-radio power cap Pcap1), setting the first-radio power cap Pcap1 to remain unchanged or to be higher; e.g., setting the current value of the first-radio power cap Pcap1 to equal the preceding value of the first-radio power cap Pcap1, or to be higher than the preceding value of the first-radio power cap Pcap1. In an embodiment, step 4111 may set the first-radio power cap Pcap1 to one of the levels L1[1] to L1[8]. It is noted that, although eight predefined levels L1[1] to L1[8] are depicted in the examples of FIG. 8, the invention is not so constrained. More generally, there may be a number Nd1 (e.g., a predefined integer greater than one) of predefined levels L1[1] to L1[Nd1] to be utilized when setting the first-radio power cap Pcap1 at steps 4071, 4091 and 4111. FIG. 11 depicts the levels L1[1] to L1[Nd1]; in an embodiment, values of the levels L1[1] to L1[Nd1] may be descending; the level L1[1] may be the highest among the levels L1[1] to L1[Nd1], and the level L1[Nd1] may be the lowest. In an embodiment, the levels L1[1] to L1[Nh1] (with Nh1 being a predefined integer smaller than Nd1) may be higher than the first-radio power limit Plimit1, and the levels L1[Nh1+1] to L1[Nd1] may be lower than the first-radio power limit Plimit1, and there may be a relation L1[1]> . . . >L1[Nh1]>Plimit1>L1[Nh1+1]> . . . >L1[Nd1], as shown in FIG. 11. In an embodiment, when setting the first-radio power cap Pcap1 to be higher, if the preceding value of the first-radio power cap Pcap1 equals a level L1[$n$] of the levels L1[1] to L1[Nd1], step 4111 may set the current value of the first-radio power cap Pcap1 to a higher level L1[$n$−1] of the levels L1[1] to L1[Nd1]. In an embodiment, when the first-radio power limit Plimit1 changes (FIG. 6), values of the levels L1[1] to L1[Nd1] may also change; for example, as the first-radio power limit Plimit1 changes to be higher, each of the levels L1[1] to L1[Nd1] may change to be higher, while the relation L1[1]> . . . >L 1[Nh1]>Plimit1>L1[Nh1+1]> . . . >L1[Nd1] remains unchanged. In the examples depicted by FIG. 8, the numbers Nh1 and Nd1 are assumed to be 4 and 8 respectively, but the invention is not so limited; the numbers Nh1 and Nd1 may be fewer or more.

Back to FIG. 4, as step 4091 or 4111 sets the first-radio power cap Pcap1, step 4091 or 4111 may proceed to step 4131. Step 4131 may comprise: when the RF peripheral circuit 12 (FIG. 1) transmits power during the period T1[$i$+1], causing power transmitted using the first radio technology to be capped by the first-radio power cap Pcap1 during the subsequent period T1[$i$+1] after the current time t1[$i$].

Step 4151 may comprise: calculating the first-radio power margin Pmrgn1 according to power transmitted using the first radio technology during the period T1[$i$]. In an embodiment, calculation of step 4151 may cause the first-radio power margin Pmrgn1 to be negatively correlated to the power transmitted using the first radio technology during the period T1[$i$]. For example, as the power transmitted using the first radio technology during the period T1[$i$] is larger, the first-radio power margin Pmrgn1 may be smaller. In an embodiment, the first-radio power margin Pmrgn1 may relate to a difference between the first-radio power limit Plimit1 and the power transmitted using the first radio technology during the period T1[$i$].

Step 4171 may comprise: storing related data, and then iterating back to step 4011 with time index i incremented. The related data may include the first-radio power margin Pmrgn1 resulting from step 4151, the power sequence SQ1 resulting from step 4051, and/or power contribution(s) which may reflect average power transmitted during the period T1[$i$+1] by first-radio configuration(s) possible to be adopted.

Step 4191 of the first-radio type-two control procedure 2051 may comprise: setting the first-radio power cap Pcap1 to a value of a plurality of gears (not shown), and proceeding to step 4131. Step 4191 may change the value of the first-radio power cap Pcap1 by switching between different ones of the plurality of gears in response to at least one of: duty cycle and currently adopted one(s) of the configurations c1[1] to c1[Nc1] (FIG. 1) of the first radio technology. FIG. 12 depicts comparison of the first-radio type-one control procedure 2031 and the first-radio type-two control procedure 2051. When a first-radio scenario, which causes step 4011 (FIG. 4) to proceed to the first-radio type-two control procedure 2051, lasts for one or more second periods, step 4191 of the first-radio type-two control procedure 2051 may set the first-radio power cap Pcap1 to a value below, but close to, the first-radio power limit Plimit1 during the second period(s). As shown in FIG. 12, in an embodiment, step 4191 may keep the value of the first-radio power cap Pcap1 unchanged during the second period(s). In an embodiment not depicted, step 4191 may change the value of the first-radio power cap Pcap1 in response to duty cycle and/or configuration(s) of the first radio technology during the second period(s). In an embodiment not depicted, the value of the first-radio power cap Pcap1 may change within one period.

When another first-radio scenario, which causes step 4011 (FIG. 4) to proceed to the first-radio type-one control procedure 2031, lasts for one or more first periods, the first-radio type-one control procedure 2031 may dynamically and adaptively vary the first-radio power cap Pcap1; for example, the first-radio type-one control procedure 2031 may set the first-radio power cap Pcap1 to be higher than the first-radio power limit Plimit1 during one or more of the first period(s), and may set the first-radio power cap Pcap1 to be lower than the first-radio power limit Plimit1 during other one or more of the first period(s).

The first-radio type-one control procedure 2031 may set the first-radio power cap Pcap1 based on the estimation (step 4071) of whether the first-radio window average power Pavg1 will exceed the first-radio power limit Plimit1 in the future. By setting the first-radio power cap Pcap1 to be higher than the first-radio power limit Plimit1, the first-radio type-one control procedure 2031 may improve and enhance data throughput and efficiency of communication capacity; by setting the first-radio power cap Pcap1 to be lower than the first-radio power limit Plimit1, the first-radio type-one control procedure 2031 may control the first-radio window average power Pavg1 not to exceed the first-radio power limit Plimit1, and may therefore maintain compliance to regulations of RF exposure. On the other hand, the first-radio type-two control procedure 2051 may set the first-radio power cap Pcap1 in response to duty cycle and/or configuration(s) of the first radio technology, rather than based on the estimation of whether the first-radio window average power Pavg1 will exceed the first-radio power limit Plimit1 in the future.

Because each of the first-radio type-one control procedure 2031 and the first-radio type-two control procedure 2051 has its own merit and is therefore suitable for its specific scenarios, switching between the first-radio type-one control procedure 2031 and the first-radio type-two control procedure 2051 in response to scenario will be technically beneficial.

Back to FIG. 4, in the second-radio transmission power control process 2012, step 4012 may comprise: based on the second-radio scenario, selecting whether to proceed to step 4032 of the second-radio type-one control procedure 2032, or to step 4192 of the second-radio type-two control procedure 2052.

Step 4032 may start substantially at the time t2[$j$] (FIG. 3b), and may include: determining a current value of the second-radio power limit Plimit2 according to one or more second-radio power limit decision factors. In an embodiment, the second-radio power limit decision factor(s) may reflect a current subset Uc2[$j$] of the configurations c2[1] to c2[Nc2] (FIG. 1) which is possible to be adopted at the time t1[$i$]; for example, step 4032 may determine the current value of the second-radio power limit Plimit2 according to the current subset Uc2[$j$] of the configurations c2[1] to c2[Nc2]. In an embodiment, the second-radio power limit decision factor(s) may further include the first-radio power margin Pmrgn1 (FIG. 2); for example, step 4032 may determine the current value of the second-radio power limit Plimit2 jointly according to the first-radio power margin Pmrgn1 (FIG. 2) and the subset Uc2[1] of the configurations c2[1] to c2[Nc2]. The first-radio power margin Pmrgn1 may result from step 4151 of the first-radio transmission power control process 2011.

Figure 13:
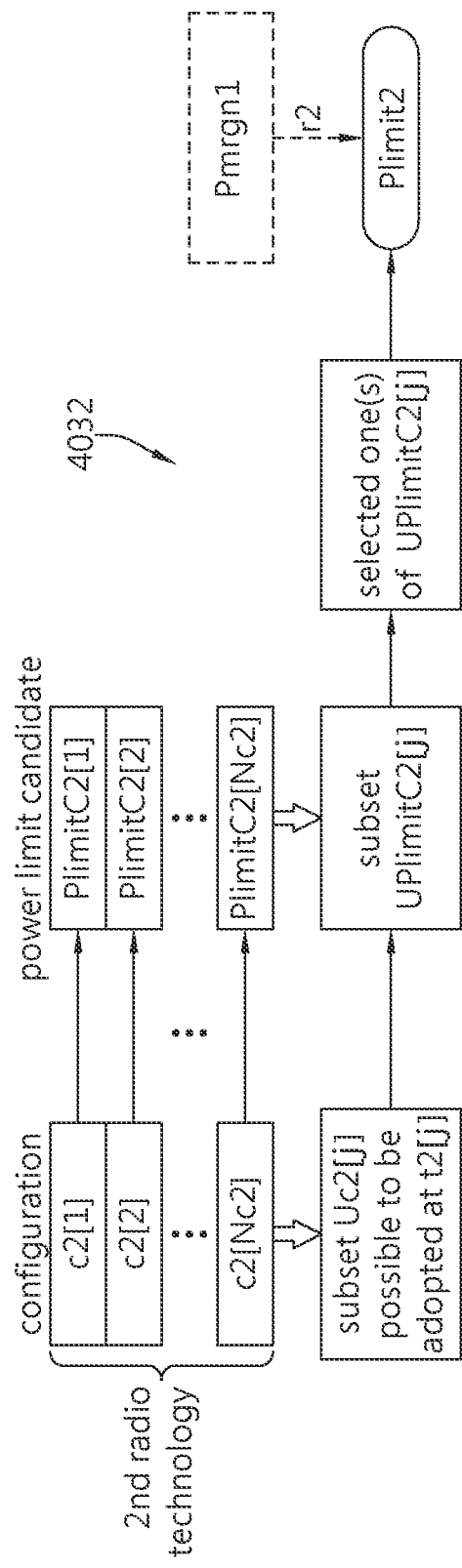

FIG. 13 depicts operation of step 4032 according to an embodiment of the invention. At the time t2[j], one, some or all of the configurations c2[1] to c2[Nc2] may be possible to be adopted, and may form the subset Uc2[j] of the configurations c2[1] to c2[Nc2]. The configurations c2[1] to c2[Nc2] may be associated with predefined power limit candidates PlimitC2[1] to PlimitC2[Nc2] respectively, wherein each power limit candidate PlimitC2[n], for n=1 to Nc2, may reflect the effects (weight) of the associated configuration c2[n]. Accordingly, the current subset Uc2[j] of the configurations c2[1] to c2[Nc2] will be associated with a current subset UPlimitC2[j] of the power limit candidates PlimitC2[1] to PlimitC2[Nc2].

In an embodiment, the second-radio power limit decision factor(s) may include selected one or ones of the subset UPlimitC2[j] of the power limit candidates PlimitC2[1] to PlimitC2[Nc2], and/or other second-radio auxiliary data which may include predefined value(s) and/or calculated value(s) not depicted; for example, step 4032 may determine the current value of the second-radio power limit Plimit2 according to the selected one or ones of the subset UPlimitC2[j] of the power limit candidates PlimitC2[1] to PlimitC2[Nc2], and/or the second-radio auxiliary data; for a further example, step 4032 may set the second-radio power limit Plimit2 to substantially equal a selected one of the subset UPlimitC2[j] of the power limit candidates PlimitC2[1] to PlimitC2[Nc2] or (a selected one of) the second-radio auxiliary data. In another embodiment, the second-radio power limit decision factor(s) may further include the first-radio power margin Pmrgn1 besides the selected one or ones of the subset UPlimitC2[j] of the power limit candidates PlimitC2[1] to PlimitC2[Nc2] and/or the second-radio auxiliary data; for example, step 4032 may determine the current value of the second-radio power limit Plimit2 jointly according to the first-radio power margin Pmrgn1, the selected one(s) of the subset UPlimitC2[j] of the power limit candidates PlimitC2[1] to PlimitC2[Nc2], and/or the second-radio auxiliary data; for a further example, step 4032 may determine the second-radio power limit Plimit2 by setting the second-radio power limit Plimit2 to substantially equal a result of scaling a selected one of the subset UPlimitC2[j] of the power limit candidates PlimitC2[1] to PlimitC2[Nc2] or (a selected one of) the second-radio auxiliary data by a ratio r2. The ratio r2 may be a value less than or equal to one, and may be positively correlated to the first-radio power margin Pmrgn1. For example, as the first-radio power margin Pmrgn1 is larger, the ratio r2 may be larger and closer to one.

Figure 14:
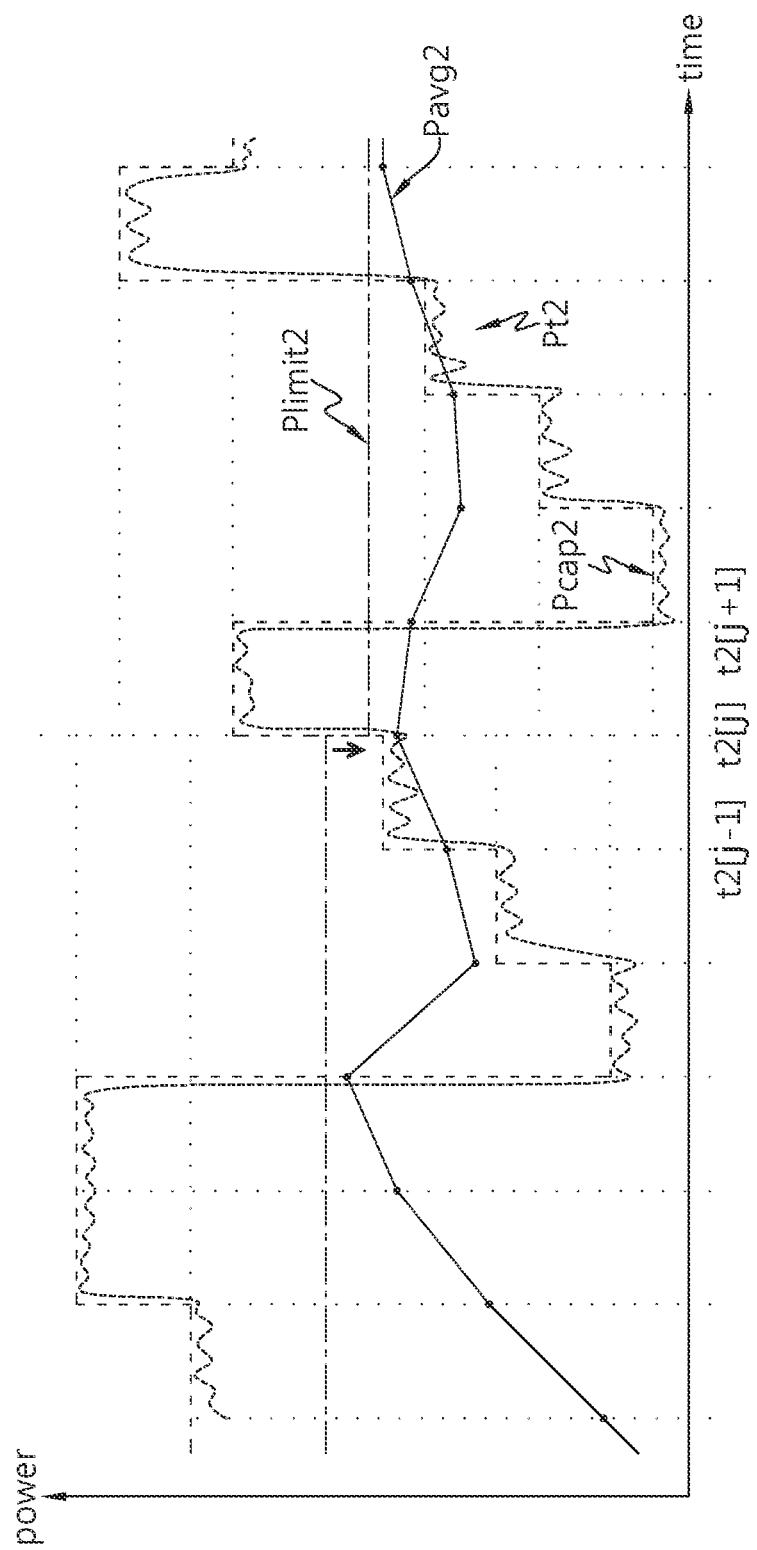

The value of the second-radio power limit Plimit2 may change with time. FIG. 14 depicts an example that the second-radio power limit Plimit2 changes (decreases in the depicted example) at the time t2[j]; as the second-radio power limit Plimit2 updates to a lower value after the time t2[j], the second-radio transmission power control process 2012 (FIG. 2) may control the second-radio window average power Pavg2 not to exceed the updated second-radio power limit Plimit2. The second-radio power limit Plimit2 may be lower if the subset Uc2[j] of the configurations c2[1] to c2[Nc2], which is possible to be adopted at the time t2[j], causes stronger effects (weights) on RF exposure comparing to a preceding subset Uc2[j−1] of the configurations c2[1] to c2[Nc2], which is possible to be adopted at the time t2[j−1]. And/or, the second-radio power limit Plimit2 may be lower if the first-radio power margin Pmrgn1 becomes smaller.

Figure 15:
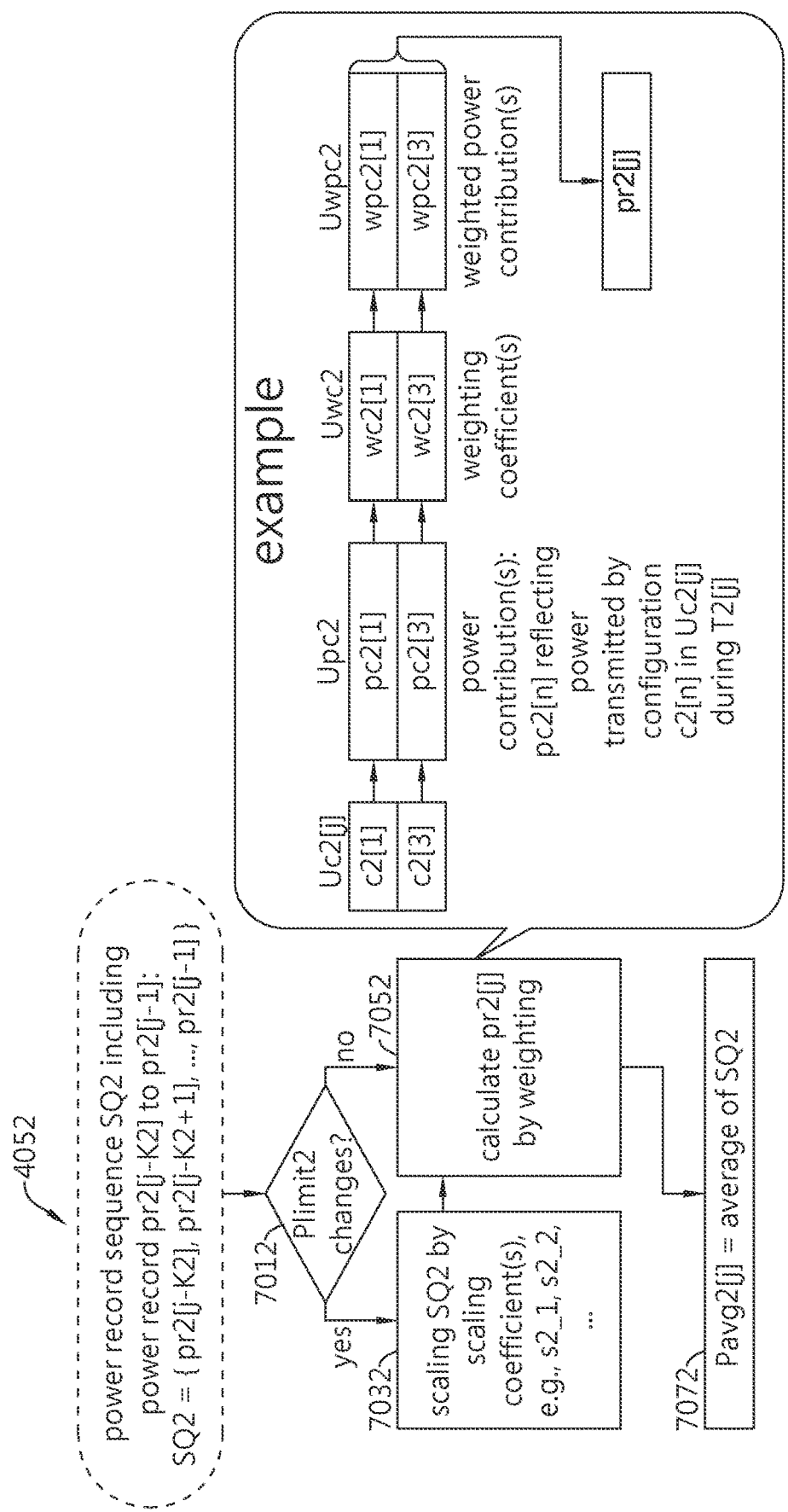

Back to FIG. 4, step 4052 may comprise data calculation, such as calculating the second-radio window average power Pavg2[j] of the time t2[j] which may reflect average power transmitted using the second radio technology during the time window w2[j] (FIG. 3b) ended at the current time t2[j]. FIG. 15 depicts details of step 4052 according to an embodiment of the invention. Step 4052 may comprise steps 7012, 7032, 7052 and 7072. Step 7012 may start with an existed power record sequence SQ2; the power record sequence SQ2 may include number K2 of power records pr2[j−K2], pr2[j−K2+1], . . . , pr2[j−1]; the power records pr2[j−K2] to pr2[j−1] may reflect average power transmitted using the second radio technology during the periods T2[j−K2] to T2[j−1], respectively.

Step 7012 may comprise: checking whether the second-radio power limit Plimit2 changes by comparing whether the current value of the second-radio power limit Plimit2 is different from the preceding value of the second-radio power limit Plimit2; if the second-radio power limit Plimit2 does not change, proceeding to step 7052; if the second-radio power limit Plimit2 changes, proceeding to step 7032.

Step 7032 may comprise: if the second-radio power limit Plimit2 changes, scaling each one of the power records pr2[j−K2] to pr2[j−1] of the power record sequence SQ2 by one or more scaling coefficients, e.g., s2_1, s2_2, . . . , etc., to update the power record sequence SQ2, and then proceeding to step 7052. That is, in the updated power record sequence SQ2, an updated value of each power record pr2[#], for #=(j−K2) to (j−1), may substantially equal a result of scaling a before-update value of the power record pr2[#] by the one or more scaling coefficients s2_1, s2_2, etc.

In an embodiment, at least one of the scaling coefficients s2_1, s2_2, etc. may relate to (e.g., be positively correlated to) the current value of the second-radio power limit Plimit2, and/or may relate to (e.g., be negatively correlated to) the preceding value of the second-radio power limit Plimit2. Therefore, if the second-radio power limit Plimit2 changes (step 7012), at least one of the scaling coefficient(s) s2_1 etc. may be less than one or greater than one.

Step 7052 may comprise: calculating a current power record pr2[j] which may reflect average power transmitted using the second radio technology during the period T2[j], and proceeding to step 7072. As mentioned earlier (e.g., FIG. 17), one, some or all of the configurations c2[1] to c2[Nc2], which is/are possible to be adopted at the time t2[j], may form the current subset Uc2[j] of the configurations c2[1] to c2[Nc2]. Hence, when the RF peripheral circuit 12 transmits power using the second radio technology during the period T2[j], the current subset Uc2[j] of the configurations c2[1] to c2[Nc2] may further be associated with a collection Upc2 of power contributions and a collection Uwc2 of weighting coefficients, wherein each configuration c2[n] of the current subset Uc2[j] of the configurations c2[1] to c2[Nc2] may be associated with a power contribution pc2[n] of the collection Upc2 of power contributions and a weighting coefficient wc2[n] of the collection Uwc2 of weighting coefficients; the power contribution pc2[n] may reflect average power transmitted by the associated configuration c2[n] during the period T2[j], and the weighting coefficient wc2[n] may relate to (e.g., be positively correlated to) the current value of the second-radio power limit Plimit2, and/or may relate to (e.g., be negatively correlated to) the associated power limit candidate PlimitC2[n].

Accordingly, step 7052 may weight the collection Upc2 of power contributions respectively by the collection Uwc2 of weighting coefficients to form a collection Uwpc2 of weighted power contributions, and may calculate the current power record pr2[j] according to (e.g., by summarizing over) the collection Uwpc2 of weighted power contributions. FIG.

15 also shows an example demonstrating operation of step 7052; in the example, the current subset Uc2[j] of the configurations c2[1] to c2[Nc2] is {c2[1], c2[3]}, so the collection Upc2 of power contributions may be {pc2[1], pc2[3]}, the collection Uwc2 of weighting coefficients may be {wc2[1], wc2[3]}, the collection Uwpc2 of weighted power contributions may be {wpc2[1], wpc2[3]}. The current power record pr2[j] may then be calculated according to the collection Uwpc2 of weighted power contributions {wpc2[1], wpc2[3]}. The power contributions pc2[1] and pc2[3] may respectively reflect average power transmitted by the configurations c2[1] and c2[3] during the period T2[j].

By discarding the power record pr2[j–K2] from the power record sequence SQ2 and appending the current power record pr2[j] to the power record sequence SQ2, the power record sequence SQ2 may be updated to include the power records pr2[j–K2+1] to pr2[j], e.g., SQ2={pr2[j–K2+1], . . . , pr2[j]}.

Step 7072 may comprise: calculating the second-radio window average power Pavg2[j] of the current time t2[j] by an average of the power record sequence SQ2. In the power record sequence SQ2, the power records pr2[j–K2+1] to pr2[j] may respectively reflect average power transmitted using the second radio technology during the period T2[j–K2+1] to T2[j] (FIG. 3b), so average of the power record sequence SQ2, i.e., average of the power records pr2[j–K2+1] to pr2[j], may reflect the second-radio window average power Pavg2[j] of the time t2[j].

Figure 16:
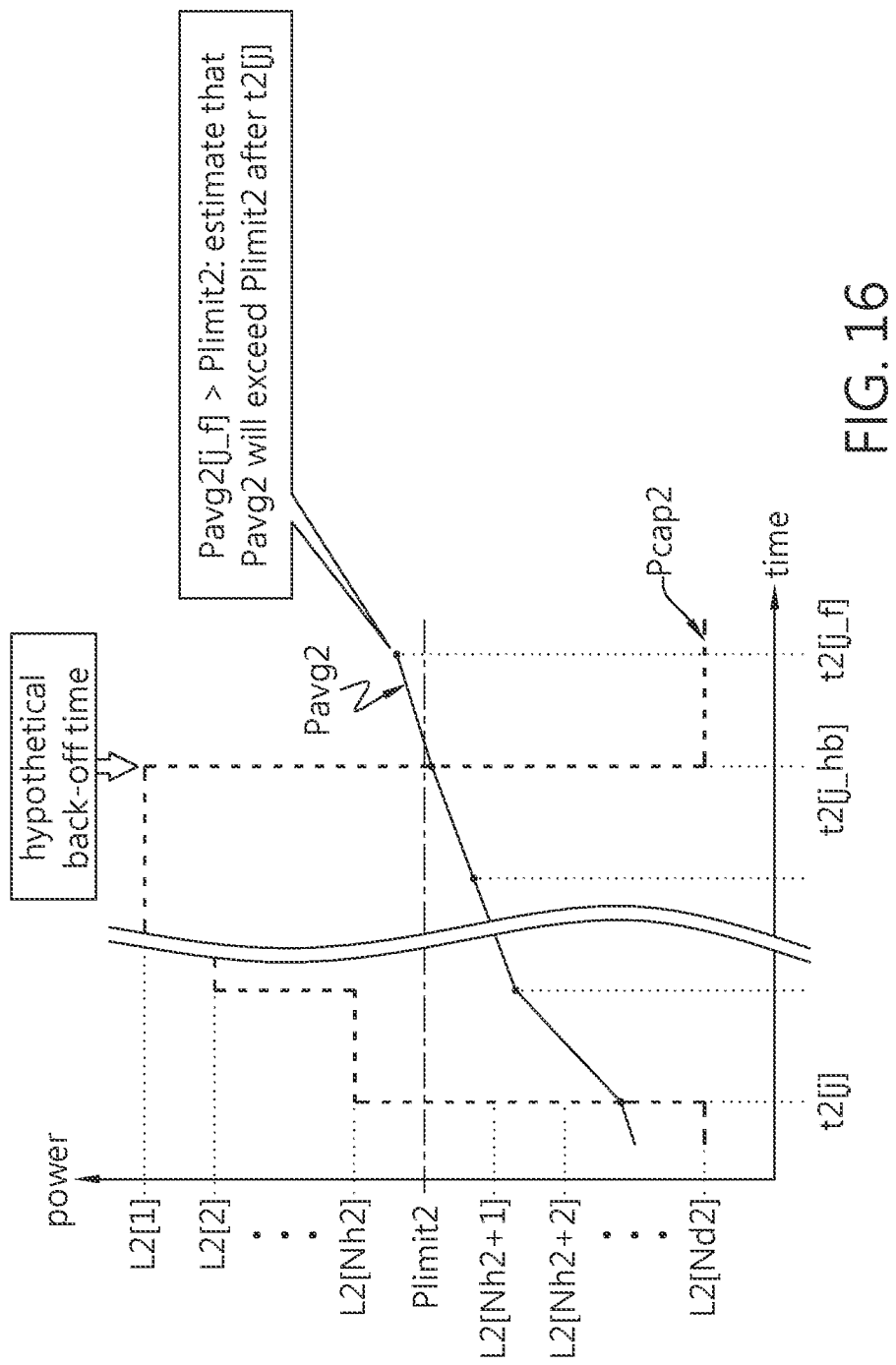

Back to FIG. 4, after step 4052, step 4072 may comprise: (substantially) at the time t2[j], estimating whether the second-radio window average power Pavg2 will exceed the second-radio power limit Plimit2 after the time t2[j]; if true, proceeding to step 4092; if false, proceeding to step 4112. FIG. 16 depicts an example demonstrating operation of step 4072. At step 4072, estimating whether the second-radio window average power Pavg2 will exceed the second-radio power limit Plimit2 after the time t2[j] may comprise: by assuming that the second-radio power cap Pcap2 is lowered at a hypothetical back-off time t2[j_hb], calculating the second-radio window average power Pavg2[j_f] of a future time t2[j_f], wherein the hypothetical back-off time t2[j_hb] may not be earlier than the time t2[j], and the future time t2[j_f] may be later than the hypothetical back-off time t2[j_hb]; if the second-radio window average power Pavg2 [j_f] of the future time t2[j_f] exceeds the second-radio power limit Plimit2 (as shown in FIG. 16), estimating that the second-radio window average power Pavg2 will exceed the second-radio power limit Plimit2 after the time t2[j].

As shown in FIG. 16, in an embodiment, step 4072 may calculate the second-radio window average power Pavg2 [j_f] of the future time t2[j_f] under an assumption that the second-radio power cap Pcap2 is in a second-radio high range (not depicted) between the times t2[j] and t2[j_hb], and is lowered to be in a second-radio low range (not depicted) between the times t2[j_hb] and t2[j_f], wherein the second-radio high range and the second-radio low range may be different. In an embodiment, the second-radio high range may cover one or ones of predefined high levels L2[1] to L2[Nh2]; and/or, the second-radio high range may cover a sum of a first offset and a preceding value of the second-radio power cap Pcap2. In an embodiment, the second-radio low range may cover one of predefined low levels L2[Nh2+1] to L2[Nd2]; and/or, the second-radio low range may cover a sum of a second offset and the preceding value of the second-radio power cap Pcap2. In an embodiment, the second-radio high range may be higher than the second-radio power limit Plimit2; in an embodiment, the second-radio low range may be lower than the second-radio power limit Plimit2. In an embodiment, the high levels L2[1] to L2[Nh2] (with Nh2 being a predefined integer not smaller than one) may be higher than the second-radio power limit Plimit2, and the low levels L2[Nh2+1] to L2[Nd2] (with Nd2 being a predefined integer larger than Nh2) may be lower than the second-radio power limit Plimit2. In an embodiment, the future time t2[j_f] may be a subsequent time t2[j_hb+1] after the time t2[j_hb].

Starting with an variable k equal to zero, step 4072 may conduct a computation operation to calculate the second-radio window average power Pavg2[j+k+1] of the time t2[j+k+1] under an assumption that the hypothetical back-off time and the future time are the times t2[j+k] and t2[j+k+1] respectively; according to whether the second-radio window average power Pavg2[j+k+1] of the time t2[j+k+1] exceeds the second-radio power limit Plimit2 or not, step 4072 may proceed to step 4092 (FIG. 4), or may cycle back to said computation operation with the variable k incremented, until the variable k reaches an upper bound.

When calculating the second-radio window average power Pavg2[j+1] of the time t2[j+1] substantially at the time t2[j], step 4072 will need the power records pr2[j–K2+2] to pr2[j+1] respectively reflecting average power transmitted using the second radio technology during the periods T2[j–K2+2] to T2[j+1]. Step 4072 may access the power records pr2[j–K2+2] to pr2[j] from the power record sequence SQ2, which may result from step 4052 (FIG. 4 and FIG. 15), by discarding the power record pr2[j–K2+1] from the power record sequence SQ2, and may estimate the power record pr2[j+1].

Figure 17:
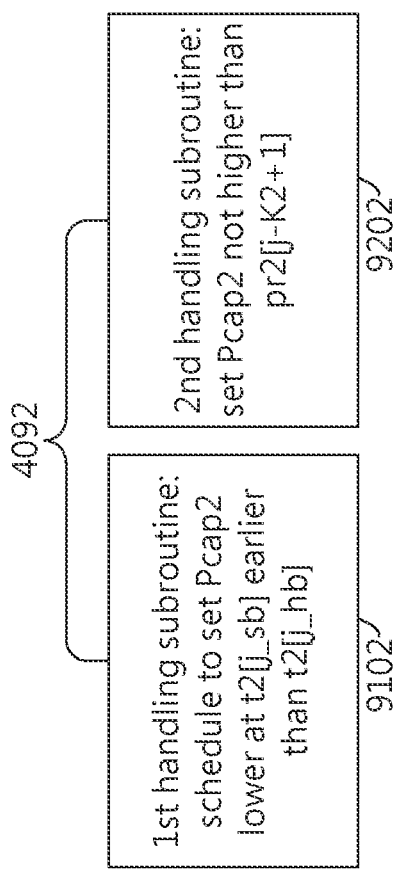

FIG. 17 depicts details of step 4092 (FIG. 4) according to an embodiment of the invention. Step 4092 may comprise: executing a first handling subroutine 9102 and/or a second handling subroutine 9202 to set the second-radio power cap Pcap2. As step 4072 (FIG. 4) estimates that lowering the second-radio power cap Pcap2 (e.g., from one(s) of the levels L2[1] to L2[Nh2] to one(s) of the levels L2[Nh2+1] to L2[Nd2]) at the hypothetical back-off time t2[j_hb] will still cause the second-radio window average power Pavg2 to exceed the second-radio power limit Plimit2 and therefore proceeds to step 4092, the first handling subroutine 9102 may comprise: (substantially) at the time t2[j], scheduling to set the second-radio power cap Pcap2 lower (e.g., from one of the high levels L2[1] to L2[Nh2] to one of the low levels L2[Nh2+1] to L2[Nd2]) at a scheduled time t2[j_sb] earlier than the hypothetical back-off time t2[j_hb]. In an embodiment, the scheduled time t2[j_sb] may be a preceding time t2[j_hb–1] before the hypothetical back-off time t2[j_hb]. In an embodiment, the scheduled time t2[j_sb] may be later than the current time t2[j].

In an embodiment, besides scheduling to lower the second-radio power cap Pcap2 at the scheduled time t2[j_sb], the first handling subroutine 9102 (FIG. 17) may further comprise: (substantially) at the current time t2[j], setting the second-radio power cap Pcap2 to one of the high levels L2[1] to L2[Nh2], if the current time t2[j] is not previously scheduled to lowering the second-radio power cap Pcap2.

As estimation of step 4072 (FIG. 4) may involve discarding the power record pr2[j–K2+1] (e.g., when calculating the second-radio average power Pavg2[j+1] of the time t[j+1]), the second handling subroutine 9202 may comprise: (substantially) at the time t2[j], setting the second-radio power cap Pcap2 not higher than (e.g., substantially equal to) the power record pr2[j–K2+1], which may reflect average power transmitted using the second radio technology during the past period T2[$j$−K2+1] ended at the time t2[$j$−K2+1]. In an embodiment, the power record pr2[$j$−K2+1] may be lower than the level L2[Nd2].

In an embodiment, the first and second handling subroutines 9102 and 9202 of step 4092 may both be utilized. At the time t2[$j$], if step 4072 (FIG. 4) estimates that the second-radio window average power Pavg2 will exceed the second-radio power limit Plimit2 at the subsequent time t2[$j$+1], step 4072 may proceed to the second handling subroutine 9202 of step 4092; if step 4072 (FIG. 4) estimates that the second-radio window average power Pavg2 will not exceed the second-radio power limit Plimit2 at the time t2[$j$+1] but will exceed the second-radio power limit Plimit2 after the time t2[$j$+1], step 4072 may proceed to the first handling subroutine 9102 of step 4092.

Figure 18:
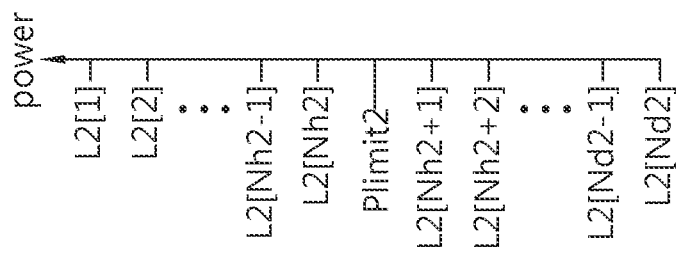

Back to FIG. 4, if step 4072 estimates that the second-radio window average power Pavg2 will not exceed the second-radio power limit Plimit2 after the time t2[$j$], step 4072 may proceed to step 4112. Step 4112 may set the second-radio power cap Pcap2 by a normal subroutine, which may comprise: (if the current time t2[$j$] is not previously scheduled to lower the second-radio power cap Pcap2), setting the second-radio power cap Pcap2 to remain unchanged or to be higher; e.g., setting a current value of the second-radio power cap Pcap2 to equal a preceding value of the second-radio power cap Pcap2, or to be higher than the preceding value of the second-radio power cap Pcap2. In an embodiment, step 4112 may set the second-radio power cap Pcap2 to one of the levels L2[1] to L2[Nd2]. FIG. 18 depicts the levels L2[1] to L2[Nd2]; in an embodiment, values of the levels L2[1] to L2[Nd2] may be descending; the level L2[1] may be the highest among the levels L2[1] to L2[Nd2], and the level L2[Nd2] may be the lowest. In an embodiment, the level L2[1] to L2[Nh2] may be higher than the second-radio power limit Plimit2, and the levels L2[Nh2+1] to L2[Nd2] may be lower than the second-radio power limit Plimit2, and there may be a relation L2[1]> . . . >L2[Nh2]>Plimit2>L2[Nh2+1]> . . . >L2[Nd2], as shown in FIG. 18. In an embodiment, when setting the second-radio power cap Pcap2 to be higher, if the preceding value of the second-radio power cap Pcap2 is set to a level L2[$n$] of the levels L2[1] to L2[Nd2], step 4112 may set the current value of the second-radio power cap Pcap2 to a higher level L2[$n$−1] of the levels L2[1] to L2[Nd2]. In an embodiment, when the second-radio power limit Plimit2 changes (FIG. 14), values of the levels L2[1] to L2[Nd2] may also change; for example, as the second-radio power limit Plimit2 changes to be lower, each of the levels L2[1] to L2[Nd2] may change to be lower, while the relation L2[1]> . . . > L2[Nh2]>Plimit2>L2[Nh2+1]> . . . >L2[Nd2] remains unchanged.

Back to FIG. 4, as step 4092 or 4112 sets the second-radio power cap Pcap2, step 4092 or 4112 may proceed to step 4132. Step 4132 may comprise: when the RF peripheral circuit 12 (FIG. 1) transmits power during the subsequent period T2[$j$+1] after the current time t2[$j$], causing power transmitted using the second radio technology to be capped by the second-radio power cap Pcap2 during the period T2[$j$+1].

Step 4152 may comprise: calculating the second-radio power margin Pmrgn2 according to the average power transmitted using the second radio technology during the period T2[$j$]. In an embodiment, calculation of step 4172 may cause the second-radio power margin Pmrgn2 to be negatively correlated to the average power transmitted using the second radio technology during the period T2[$j$]. For example, as the average power transmitted using the second radio technology during the period T2[$j$] is larger, the second-radio power margin Pmrgn2 may be smaller. In an embodiment, the second-radio power margin Pmrgn2 may relate to a difference between the second-radio power limit Plimit2 and the average power transmitted using the second radio technology during the period T2[$j$].

Step 4172 may comprise: storing related data, and then iterating back to step 4012 with time index j incremented. The related data may include the second-radio power margin Pmrgn2 resulting from step 4152, the power sequence SQ2 resulting from step 4052, and/or power contribution(s) which may reflect average power transmitted during the period T2[$j$+1] by configuration(s) possible to be adopted.

Figure 19:
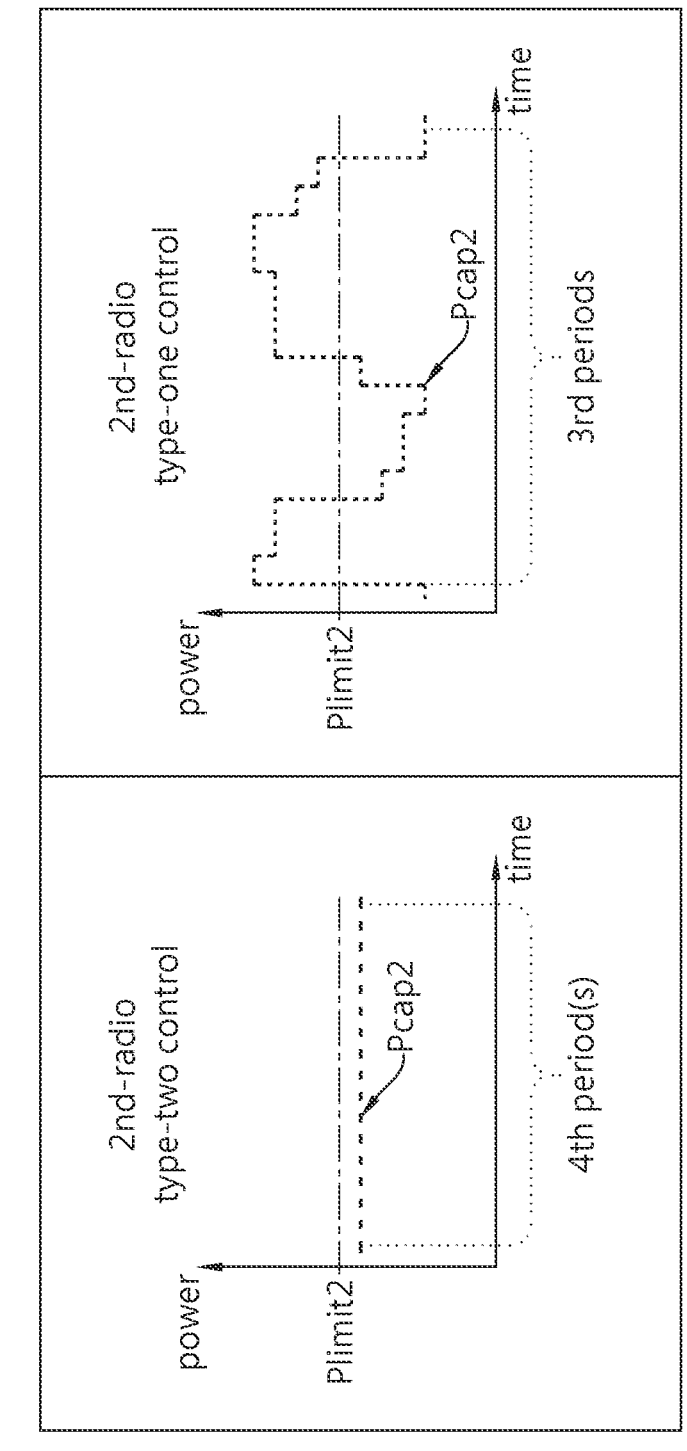

Step 4192 of the second-radio type-two control procedure 2052 may comprise: setting the second-radio power cap Pcap2 to a value of a plurality of gears, and proceeding to step 4132. Step 4192 may change the value of the second-radio power cap Pcap2 by switching between different ones of the plurality of gears in response to at least one of: duty cycle and currently adopted one(s) of the configurations c2[1] to c2[Nc2] (FIG. 1) of the second radio technology. FIG. 19 depicts comparison of the second-radio type-one control procedure 2032 and the second-radio type-two control procedure 2052. When a second-radio scenario, which causes step 4012 (FIG. 4) to proceed to the second-radio type-two control procedure 2052, lasts for one or more fourth periods, step 4192 of the second-radio type-two control procedure 2052 may set the second-radio power cap Pcap2 to a value below, but close to, the second-radio power limit Plimit2 during the fourth period(s). As shown in FIG. 19, in an embodiment, step 4192 may keep the value of the second-radio power cap Pcap2 unchanged during the fourth period(s). In an embodiment not depicted, step 4192 may change the value of the second-radio power cap Pcap2 in response to duty cycle and/or configuration(s) of the second radio technology during the fourth period(s). In an embodiment not depicted, the value of the second-radio power cap Pcap2 may change within one period.

When another second-radio scenario, which causes step 4012 (FIG. 4) to proceed to the second-radio type-one control procedure 2032, lasts for one or more third periods, the second-radio type-one control procedure 2032 may dynamically and adaptively vary the second-radio power cap Pcap2; for example, the second-radio type-one control procedure 2032 may set the second-radio power cap Pcap2 to be higher than the second-radio power limit Plimit2 during one or more of the third period(s), and may set the second-radio power cap Pcap2 to be lower than the second-radio power limit Plimit2 during other one or more of the third period(s). While the second-radio type-one control procedure 2032 may set the second-radio power cap Pcap2 based on the estimation (step 4072) of whether the second-radio window average power Pavg2 will exceed the second-radio power limit Plimit2 in the future, the second-radio type-two control procedure 2052 may set the second-radio power cap Pcap2 in response to duty cycle and/or configuration(s) of the second radio technology, rather than based on the estimation of whether the second-radio window average power Pavg2 will exceed the second-radio power limit Plimit2 in the future.

Back to FIG. 4, because the first-radio scenario and the second-radio scenario may be independent, when communicating using both the first radio technology and the second radio technology, the method 200 may select the first-radio type-one control procedure 2031 and the second-radio type-two control procedure 2052, may select the first-radio and second-radio type-one control procedures 2031 and 2032, may select the first-radio type-two control procedure 2051 and the second-radio type-one control procedure 2032, or may select the first-radio and second-radio type-two control procedures 2051 and 2052 respectively for the first and second radio technologies. When the first-radio type-one control procedure 2031 or the first-radio type-two control procedure 2051 is kept being selected, the method 200 may change selection of the second-radio type-one control procedure 2032 and the second-radio type-two control procedure 2052, e.g., may switch from the second-radio type-one control procedure 2032 to the second-radio type-two control procedure 2052. Similarly, When the second-radio type-one control procedure 2032 or the second-radio type-two control procedure 2052 is kept being selected, the method 200 may change selection of the first-radio type-one control procedure 2031 and the first-radio type-two control procedure 2051.

Figure 20B:
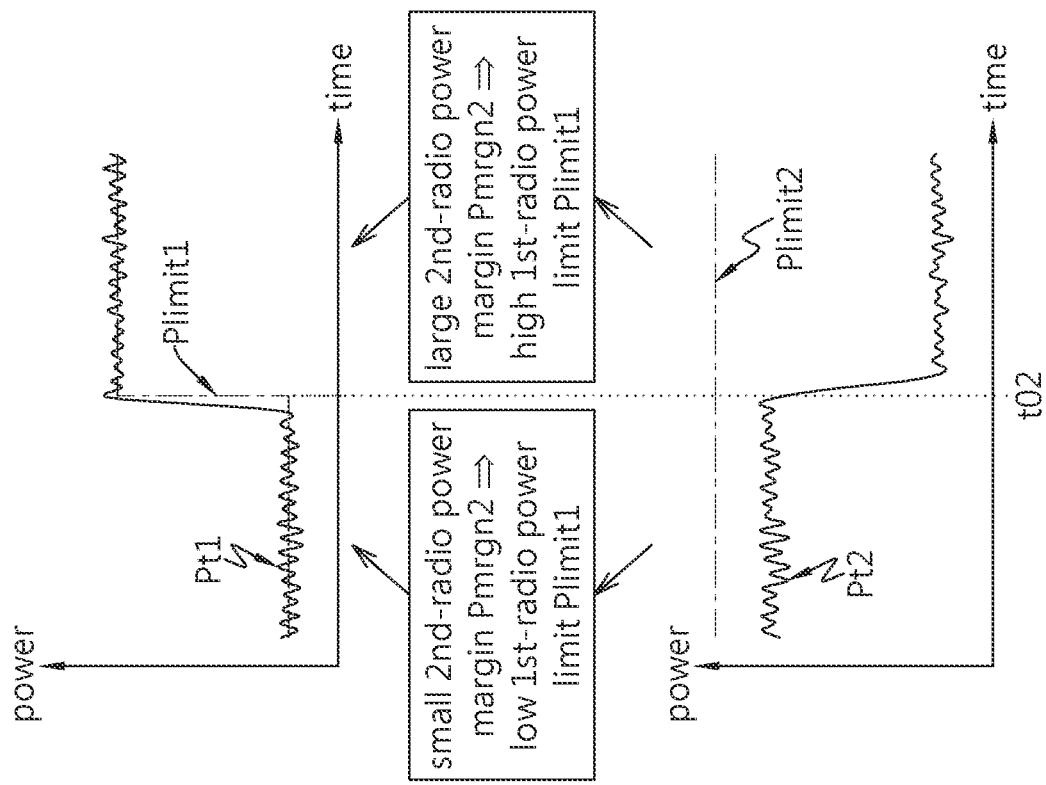
FIGS. 20*a* and 20*b* depict examples of interaction between the two transmission power control processes according to embodiments of the invention.
Figure 20A:
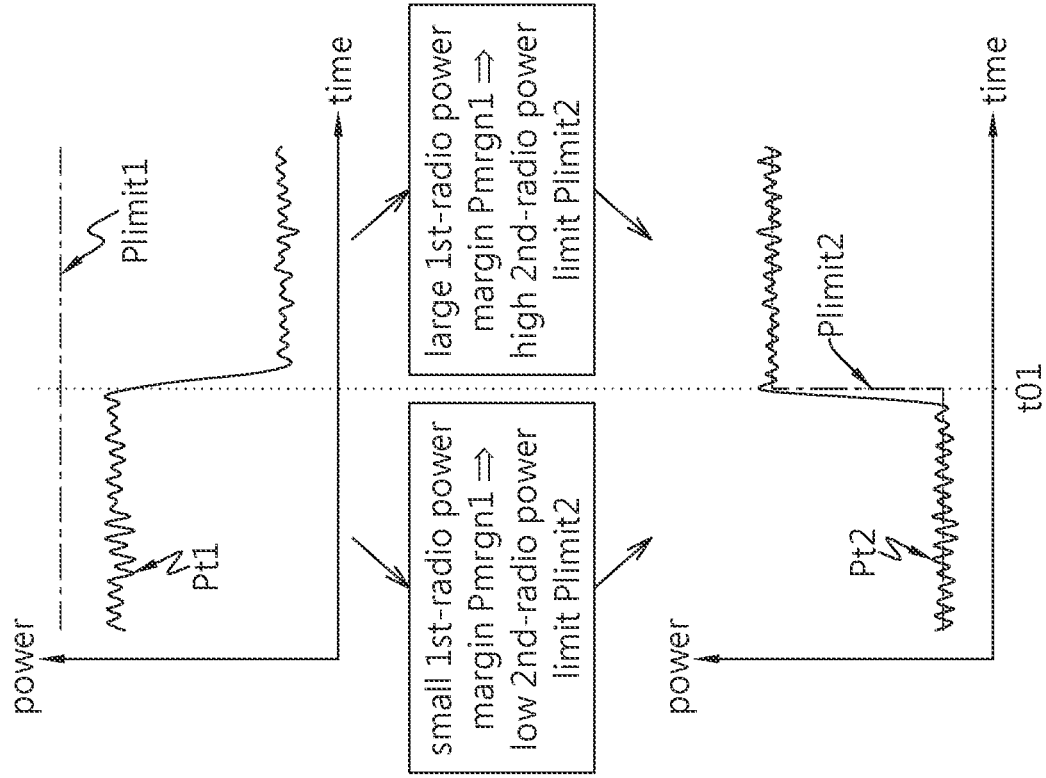

FIGS. 20a and 20b depict examples demonstrating interaction between the first-radio transmission power control process 2011 (FIG. 2 or 4) and the second-radio transmission power control process 2012 according to embodiments of the invention. As shown in FIG. 20a, before a time t01, the first-radio transmission power Pt1 is close to the first-radio power limit Plimit1, the first-radio power margin Pmrgn1 calculated at step 4151 (FIG. 4) will therefore be small; in response to the small first-radio power margin Pmrgn1, step 4032 may determine to set the second-radio power limit Plimit2 low, so total RF exposure jointly caused by the first and second radio technologies may remain compliant to regulations of RF exposure.

As shown in FIG. 20a, after the time t01, the first-radio transmission power Pt1 reduced to be far away from the first-radio power limit Plimit1, the first-radio power margin Pmrgn1 calculated at step 4151 will therefore be large; in response to the large first-radio power margin Pmrgn1, step 4032 may determine to set the second-radio power limit Plimit2 high, so the second-radio transmission power control process 2012 may gain better data throughput and efficiency of communication capacity without compromising compliance to regulations of RF exposure.

Briefly speaking, in the embodiment depicted by FIG. 20a, step 4032 may dynamically and adaptively adjust value of the second-radio power limit Plimit2 in response to the first-radio power margin Pmrgn1 resulting from step 4151. In an embodiment, the second-radio type-two control procedure 2052 may further comprise a step (not shown) like step 4032 to determine the second-radio power limit Plimit2 between steps 4012 and 4192, and the determining step of the second-radio type-two control procedure 2052 may determine the second-radio power limit Plimit2 jointly according to the first-radio power margin Pmrgn1 as well as selected one or ones of the subset UPlimitC2[$j$] of the power limit candidates PlimitC2[1] to PlimitC2[Nc2] (FIG. 13) and/or the second-radio auxiliary data.

As shown in FIG. 20b, before a time t02, the second-radio transmission power Pt2 is close to the second-radio power limit Plimit2, the second-radio power margin Pmrgn2 calculated at step 4152 (FIG. 4) will therefore be small; in response to the small second-radio power margin Pmrgn2, step 4031 may determine to set the first-radio power limit Plimit1 low, so total RF exposure jointly caused by the first and second radio technologies may remain compliant to regulations of RF exposure.

As shown in FIG. 20b, after the time t02, the second-radio transmission power Pt2 reduced to be far away from the second-radio power limit Plimit2, the second-radio power margin Pmrgn2 calculated at step 4152 will therefore be large; in response to the large second-radio power margin Pmrgn2, step 4031 may determine to set the first-radio power limit Plimit1 high, so the first-radio transmission power control process 2011 may gain better data throughput and efficiency of communication capacity without compromising compliance to regulations of RF exposure.

Briefly speaking, in the embodiment depicted by FIG. 20b, step 4031 may dynamically and adaptively adjust value of the first-radio power limit Plimit1 in response to the second-radio power margin Pmrgn2 resulting from step 4152. In an embodiment, the first-radio type-two control procedure 2051 may further comprise a step (not shown) like step 4031 to determine the first-radio power limit Plimit1 between steps 4011 and 4191, and the determining step of the first-radio type-two control procedure 2051 may determine the first-radio power limit Plimit1 jointly according to the second-radio power margin Pmrgn2 as well as selected one or ones of the subset UPlimitC1[$i$] of the power limit candidates PlimitC1[1] to PlimitC1[Nc1] (FIG. 5) and/or the first-radio auxiliary data.

To sum up, the invention may provide a transmission power management method with a comprehensive consideration to fully cover all aspects regarding RF exposure, including various radio technologies, various configurations, and various scenarios. The method according to the invention may determine power limit of one radio technology in response to power margin of another radio technology, so the former radio technology may take advantage of the redundant power margin of the latter radio technology, and RF exposure jointly caused by both radio technologies may remain compliant to regulations of RF exposure. The method according to the invention may also determine the power limit of a radio technology according to one or more configuration(s) which is/are possible to be adopted; if configuration(s) possible to be adopted has/have stronger effects on RF exposure, the method may lower the power limit, so power transmitted using the radio technology may therefore decrease to maintain compliance to regulations of RF exposure. As different configurations may have different effects on RF exposure, the method according to the invention may properly weight power contribution of each configuration to take the different effects into consideration. As configuration(s) possible to be adopt may change with time, the method according to the invention may adapt such change by properly scaling power records. The method according to the invention may switch between type-one and type-two control procedures in response to scenario of a radio technology, and may therefore adapt different scenarios. When selecting the type-one control procedure which may cap transmission power by a dynamically varying power cap, the method according to the invention may estimate whether window average power will exceed the power limit, may adopt handling subroutine(s) to ensure a timely back-off of the power cap after raising the power cap above the power limit for better communication performance, and may therefore balance high transmission power with low transmission power capped below the power limit to maintain compliance to regulation of RF exposure.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for improving transmission power management with compliance to regulations of radiofrequency exposure, comprising a first-radio type-one control procedure; the first-radio type-one control procedure being executed by a user equipment, and comprising:
   at a current time, estimating whether a first-radio window average power, which reflects average power transmitted using a first radio technology during a moving time window, will exceed a first-radio power limit after the current time; and
   if it is estimated that the first-radio window average power will exceed the first-radio power limit after the current time, proceeding to at least one of a first handling subroutine and a second handling subroutine to set a first-radio power cap;
   wherein the method further comprises: causing power transmitted using the first radio technology to be capped by the first-radio power cap; and
   wherein estimating whether the first-radio window average power will exceed the first-radio power limit after the current time comprises:
   by assuming that the first-radio power cap is lowered at a hypothetical back-off time, calculating the first-radio window average power of a future time, wherein the hypothetical back-off time is not earlier than the current time, and the future time is later than the hypothetical back-off time;
   wherein the first handling subroutine comprises: scheduling to set the first-radio power cap lower at a scheduled time earlier than the hypothetical back-off time;
   wherein estimating whether the first-radio window average power will exceed the first-radio power limit after the current time involves discarding one of a plurality of power records; and
   wherein the second handling subroutine comprises: setting the first-radio power cap not higher than the discarded one of the plurality of power records.

2. The method of claim 1, wherein the first handling subroutine further comprises:
   setting the first-radio power cap to one or more first levels higher than the first-radio power limit; and
   when scheduling to set the first-radio power cap lower at the scheduled time, scheduling to set the first-radio power cap to one or more second levels at the scheduled time, with each of the one or more second levels being lower than the first-radio power limit.

3. The method of claim 1, wherein the first-radio type-one control procedure further comprises:
   if it is estimated that the first-radio window average power will not exceed the first-radio power limit after the current time, setting the first-radio power cap to remain unchanged or to be higher.

4. The method of claim 1, wherein estimating whether the first-radio window average power will exceed the first-radio power limit after the current time further comprises:
   if the first-radio window average power of the future time exceeds the first-radio power limit, estimating that the first-radio window average power will exceed the first-radio power limit after the current time.

5. The method of claim 1 further comprising:
   calculating a second-radio power margin according to power transmitted using a second radio technology;
   wherein the first-radio type-one control procedure further comprises:
   before estimating whether the first-radio window average power will exceed the first-radio power limit after the current time, determining a value of the first-radio power limit according to the second-radio power margin.

6. The method of claim 5, wherein determining the value of the first-radio power limit according to the second-radio power margin comprises:
   causing the value of the first-radio power limit to be positively correlated to the second-radio power margin.

7. The method of claim 1, wherein:
   the user equipment supports a plurality of configurations to transmit using the first radio technology;
   the plurality of configurations is associated with a plurality of power limit candidates, respectively;
   a current subset of the plurality of configurations, which is possible to be adopted at the current time, is associated with a current subset of the plurality of power limit candidates; and
   the first-radio type-one control procedure further comprises:
   before estimating whether the first-radio window average power will exceed the first-radio power limit after the current time, determining at least a current value of the first-radio power limit according to one or more first-radio power limit decision factors;
   wherein the one or more first-radio power limit decision factors include selected one or ones of the current subset of the plurality of power limit candidates, and/or first radio auxiliary data which includes one or more predefined values and/or one or more calculated values.

8. The method of claim 7, wherein the first-radio type-one control procedure further comprises:
   checking whether the first-radio power limit changes by comparing whether the current value of the first-radio power limit is different from a preceding value of the first-radio power limit; and
   if the first-radio power limit changes, scaling each of the plurality of power records by one or more scaling coefficients to update the plurality of power records.

9. The method of claim 7, wherein the first-radio type-one control procedure further comprises:
   checking whether the first-radio power limit changes by comparing whether the current value of the first-radio power limit is different from a preceding value of the first-radio power limit; and
   if the first-radio power limit does not change, weighting a collection of power contributions by a collection of weighting coefficients to form a collection of weighted power contributions, and calculating a current power record, which reflects average power transmitted using the first radio technology during a current period, according to the collection of weighted power contributions;
   wherein each of the collection of power contributions reflects average power transmitted by an associated one of the current subset of the plurality of configurations during the current period.

10. The method of claim 7 further comprising:
    calculating a second-radio power margin according to power transmitted using a second radio technology; and
    wherein the one or more first-radio power limit decision factors further include the second-radio power margin.

11. The method of claim 10, wherein:
    determining the current value of the first-radio power limit according to the one or more first-radio power limit decision factors comprises:
    scaling the selected one or ones of the current subset of the plurality of power limit candidates and/or the first radio auxiliary data by a ratio determined according to the second-radio power margin.

12. The method of claim 7, wherein:
different ones of the plurality of configurations are different in at least one of: antenna, band, beam, technology, sub-band, one or more exposure condition indices, simultaneous transmitted state, mobile country code (MCC) and/or mobile network code (MNC), modulation, bandwidth, maximum power reduction (MPR), path, duty cycle, and combination of band and subscriber identity module (SIM).

13. The method of claim 1 further comprising:
in response to a scenario, switching between the first-radio type-one control procedure and a first-radio type-two control procedure;
wherein the first-radio type-two control procedure comprises:
setting the first-radio power cap to a value of a plurality of gears.

14. The method of claim 13, wherein the user equipment supports a plurality of configurations to transmit using the first radio technology, and the value changes by switching between different ones of the plurality of gears in response to at least one of: duty cycle and currently adopted one or ones of the plurality of configurations.

15. The method of claim 13, wherein the user equipment supports a plurality of configurations to transmit using the first radio technology, and the scenario relates to at least one of:
one or more transmitting performance indices;
one or more receiving performance indices;
one or more of the plurality of configurations; and
proximity between user and the user equipment.

16. The method of claim 15, wherein the one or more transmitting performance indices relate to at least one of:
duty cycle of transmitting;
error vector magnitude (EVM) of transmitting;
target power;
throughput;
modulation and coding scheme (MCS);
block error rate (BLER);
resource block (RB);
transmission block size (TBS) and
latency.

17. The method of claim 15, wherein the one or more receiving performance indices relate to at least one of:
duty cycle of receiving;
signal-to-Interference-plus-noise ratio (SINR) of receiving;
MCS;
received signal strength indication (RSSI); and
reference signal receiving power (RSRP).

18. A method for improving transmission power management with compliance to regulations of radiofrequency exposure, comprising:
calculating a second-radio power margin according to power transmitted using a second radio technology;
determining a first-radio power limit according to the second-radio power margin;
setting a first-radio power cap according to whether a first-radio window average power, which reflects average power transmitted using a first radio technology during a moving time window, exceeds the first-radio power limit; and
causing power transmitted using the first radio technology to be capped by the first-radio power cap.

19. The method of claim 18, wherein determining the first-radio power limit according to the second-radio power margin comprises:
causing the first-radio power limit to be positively correlated to the second-radio power margin.

20. A method for improving transmission power management with compliance to regulations of radiofrequency exposure, wherein the user equipment supports a plurality of configurations to transmit using the first radio technology, and the method comprises:
during one or more first periods, setting a first-radio power cap based on an estimation of whether a first-radio window average power, which reflects average power transmitted using the first radio technology during a moving time window, will exceed a first-radio power limit after a current time; and
during one or more second periods, setting the first-radio power cap in response to duty cycle and/or currently adopted one or ones the plurality of configurations; and
causing power transmitted using the first radio technology to be capped by the first-radio power cap.

* * * * *